United States Patent [19]

Mendenhall

[11] Patent Number: 5,421,226

[45] Date of Patent: Jun. 6, 1995

[54] HYDRAULIC FOOD CUTTER WITH AUTOMATIC BLADE CHANGER

[76] Inventor: George A. Mendenhall, 4252 S. Eagleson Rd., Boise, Id. 83705

[21] Appl. No.: 19,581

[22] Filed: Feb. 18, 1993

[51] Int. Cl.⁶ .............................................. B26D 1/03
[52] U.S. Cl. ............................................ 83/22; 83/24; 83/74; 83/98; 83/402; 83/857; 83/932
[58] Field of Search ................... 83/58, 60, 63, 72, 74, 83/22, 24, 98, 402, 404.3, 552, 563, 856, 857, 858, 932; 99/516, 537, 538

[56] References Cited

U.S. PATENT DOCUMENTS

| | | |
|---|---|---|
| 3,108,625 | 10/1963 | Lamb et al. |
| 3,109,468 | 11/1963 | Lamb et al. |
| 3,116,772 | 1/1964 | Lamb et al. |
| 3,361,173 | 1/1968 | Lamb |
| 4,082,024 | 4/1978 | Hodges et al. ........................ 83/402 |
| 4,135,002 | 1/1979 | Hodges et al. ........................ 426/482 |
| 4,300,429 | 11/1981 | Brown et al. ........................ 83/651.1 |
| 4,372,184 | 2/1983 | Fisher et al. ........................ 83/98 |
| 4,423,652 | 1/1984 | Winslow ........................ 83/24 |
| 4,614,141 | 9/1986 | Mendenhall et al. ................ 83/402 |
| 4,766,793 | 8/1988 | Fischer et al. ........................ 83/698 |
| 4,807,503 | 2/1989 | Mendenhall ........................ 83/22 |
| 4,911,045 | 3/1990 | Mendenhall ........................ 83/98 |
| 5,058,478 | 10/1991 | Mendenhall ........................ 83/857 |
| 5,095,794 | 3/1992 | Mendenhall ........................ 83/858 |
| 5,125,308 | 6/1992 | Mendenhall ........................ 83/857 |
| 5,168,784 | 12/1992 | Foster et al. ........................ 83/402 X |
| 5,191,823 | 3/1993 | Miller et al. ........................ 83/402 X |

Primary Examiner—Eugenia Jones
Attorney, Agent, or Firm—Frank J. Dykas

[57] ABSTRACT

Pressure sensing transducer 140 monitors pressure transients in the liquid in accelerator tube 110 of a hydraulic cutting system induced by food product impinging upon, being cut by, and passing through cutter blade assembly 80. The occurrence of above-normal pressure transients indicates the presence of a system blockage caused by failure of food product to pass cleanly through the cutter blade assembly, and is used as a control signal to activate stepping motor 170 to rotate cylinder assembly 12. Cylinder assembly 12 contains a plurality of barrel assemblies holding cutter blade assemblies 80 and is rotated to index clean barrel assemblies into the hydraulic cutter system pressurized fluid flow path, either upon the detection of a system blockage, or in a timed automatic replacement sequence.

21 Claims, 17 Drawing Sheets

HYDRAULIC FOOD CUTTER WITH AUTOMATIC BLADE CHANGER

BACKGROUND OF THE INVENTION

1. Technical Field

This invention relates to hydraulic food cutting apparatus and more particularly to a hydraulic food cutter having a pressure sensitive control system and a plurality of automatically interchangeable cutter blade assemblies.

2. Background Art

Many food products, particularly vegetables and fruits are processed prior to sale either by canning or freezing. Unless the product involved is of a naturally occurring edible size, for example peas, the product is usually trimmed and sliced, or diced, to edible size prior to preservation processing such as canning or freezing.

The slicing, dicing and other cutting operations have traditionally been accomplished with mechanical cutters. However, relatively recent advances in food product cutting technologies have resulted in the common use of hydraulic cutting apparatus which can be used to cut food products at relatively high speeds. Cutting capacities of 20,000 pounds to 35,000 pounds per hour are not unusual.

Hydraulic food cutters are used to cut a wide variety of food products, including potatoes, beets, zucchini or cucumbers, amongst others. The prior art relevant to the present invention are the food cutting devices themselves, and not the food product being cut. However, to place the present invention in proper context, and for purposes of clear illustration, this specification presents the prior art and the preferred embodiment in the context of a food cutter cutting potatoes. Cutting potatoes has been the most common application of the present machine. However, it should be distinctly understood that these hydraulic food cutters are capable of cutting and are used to cut a wide variety of food products.

In a typical prior art hydraulic cutting apparatus, where potatoes are to be cut, the potatoes are dropped into a tank filled with water and then pumped through conduit into an alignment chute or tube wherein the potatoes are aligned and accelerated to high speed before impinging upon a fixed array of cutter blades where the potato is cut into a plurality of smaller pieces.

The basic configuration of a prior art system, with the present invention added in, is shown in schematic format, in FIG. 16. One of the main components of a prior art hydraulic cutting apparatus for use in cutting potatoes is a receiving tank into which peeled or unpeeled potatoes are dropped. A food pump, usually a single impeller centrifugal pump, is provided. It draws its suction from the receiving tank and pumps water and the suspended potatoes from the tank into an accelerating tube which functions as the converging portion of a venturi. The accelerator tube is used to accelerate and align the potatoes immediately prior to impinging upon the stationary knife blades of the cutter blade assembly.

Each whole potato impinging upon the knife blade assembly passes through the cutting blade array and is thereby cut into a plurality of food pieces, for example french fry pieces, which pass with the water into the second half of the venturi which is a diverging tube in which the water and the cut food pieces are decelerated back to a slower velocity. The water and cut food pieces are then deposited onto a dewatering conveyer chain. The water passes through the dewatering conveyor chain and is collected and recycled back to the receiving tank. The cut food pieces remain on the conveyor chain and are carried off for further processing. In the past, significant effort has been directed toward the development of good alignment or acceleration tubes which can properly align and accelerate the whole food product so that each whole food product is properly centered relative to the cutter blade array prior to impinging upon it. Additional efforts have been made to develop cutter blade arrays or head assemblies that can be used to cut whole food product without plugging. Examples of these efforts can be seen in my patents, U.S. Pat. Nos. 5,095,794, and 5,125,308, which disclose designs for cutter blade arrays. U.S. Pat. No. 4,614,141 teaches an alignment tube assembly which is used to accelerate and align whole potatoes immediately prior to impinging upon a cutter head array. The teachings of U.S. Pat. Nos. 5,095,794, 5,125,308 and 4,614,141 are hereby incorporated by reference.

The problem is that, despite efforts to develop good alignment or acceleration tubes and cutter blade assemblies, virtually all hydraulic cutters will still occasionally plug. The exact mechanism by which a potato plugs or fails to pass cleanly through a cutter blade assembly involves the study of hydrodynamics, and statics and dynamics as they relate to the cellular structure of food products. As a result, the exact mechanism by which the cutter head plugs is not known, all that is known is that, despite all recent efforts, occasionally a food product, such as a potato, will not pass completely through the cutter head assembly, either leaving behind portions of cut food product and/or portions of uncut food product.

What happens when a food product does not pass completely through the cutter blade assembly is that the machine rapidly plugs up. For potatoes, at a 20,000 pound per hour cutting rate, given an average 10 ounce potato, the number of potatoes passing through the cutter blade assembly is approximately 32,000 potatoes per hour, or approximately 8.8 potatoes per second. If one potato plugs the cutter blade assembly, in 10 seconds there will be 88 potatoes backed up behind the cutter blade assembly; in 20 seconds, 176 potatoes. At 35,000 pounds per hour the problem is further aggravated. In practice, if a prior art hydraulic cutting apparatus plugs while unattended, it is not uncommon for the plug to include backed up, smashed potatoes all the way back and into the food pump. A plug such as this can take hours to clean out since it requires substantial disassembly of the machine and its attendant piping. As a result, it is common practice in food processing plants to provide operating personnel to continuously monitor the operation of the hydro-cutting system.

The study of what actually happens on a microscopic or cellular level when a food product, such as a potato, impinges upon the cutting blades of a cutter blade assembly is actually the study of hydrodynamics interplaying with the physics of the tearing and breaking of organic cellular structure. As a result, the actual dynamics of the cutting cannot be accurately and completely mathematically modeled. Design of cutter blade assemblies and the establishment of cutter parameters, such as fluid flow, volumes and rates for food product feed, are generally empirically determined. One thing is known, however, and that is that the sharper the cutting edges of the cutting blades, the better the quality of the cut food pieces being produced by the hydraulic food cutter. For this reason it is common practice in the industry to replace the cutter blade assembly after every three to four hours of use with a new cutter blade assembly having resharpened or replaced cutter blades. In general, a three or four hour replacement schedule is commonly used in the potato processing industry and is a compromise between food product quality and production efficiency. Replacement of the blades more frequently would produce a higher quality product. However, in the prior art, replacement of the blade holder assembly required shutting down the system for a significant period of time, and as a result the three or four hour changeover rule has been generally followed. The present invention provides a means whereby cutter heads can be replaced on a much more frequent basis than that generally available to prior art systems.

Accordingly, it is an object of the present invention to provide an apparatus which quickly senses the presence of the failure of a food product to pass completely through the cutter blade array so that the machine can either shut down, or, alternatively, automatically replace the cutter blade array assembly which is plugging with an unplugged, or clean, cutter head assembly.

Another object of the present invention is to provide a hydro-cutter assembly which has a mechanism whereby the cutter head assembly can be quickly removed from the line of fluid flow so that a mass of plugging food product can be flushed through the system thus eliminating the need to shut the entire system down for manual removal of a plugging mass of food product.

A third object of the present invention is to provide a hydro-cutting assembly which has the capability of either periodically, or selectively, changing cutter blade arrays so as to ensure that dull cutter blade knives are replaced prior to deterioration of the quality of the cut food product being processed.

DISCLOSURE OF INVENTION

These objects are achieved in a conventional hydro-cutting system by the installation of a pressure sensing transducer in the hydraulic portion of the conventional hydro-cutting system which utilizes a feed tank, food pump, accelerator tube, fixed, single cutter blade array hydro-cutter, decelerating tube, dewatering conveyor and water return line. The hydraulic portion of the system is defined as that portion extending from the discharge of the food pump through the cutter blade assembly and some distance into the decelerating tube. The pressure sensing transducer is set to monitor the normal pressure transients encountered when each whole food product impinges upon, is cut and passes through the fixed cutter blade array assembly. Signals from the pressure sensing transducer above the normal range of signals received for food product passing through the cutter blade array are used as a control signal to interrupt the flow of food product into the cutter blade array, either by shutting down the food pump, diverting the discharge of the food pump back to the feed tank, or diverting the discharge of the food pump to a standby conventional hydro-cutter.

In a second preferred embodiment, a hydraulic food cutter is provided which includes a cylinder having a plurality of barrel assemblies in parallel, elemental, and radially equidistant relationship, one to the other. The cylinder is capable of being rotated to index each barrel assembly into the hydraulic portion of the system flow path and into alignment with the discharge of the convergent end of the alignment tube. Each barrel assembly is provided with a venturi insert made of high molecular weight polypropelene, or other plastic material, and provides two features, the first being a cutter blade assembly holding area and immediately downstream of the cutter blade assembly, a second venturi.

Cutter blade assemblies of conventional design are provided. A control system is provided which includes a pressure sensing transducer which is installed in the hydraulic portion of the hydro-cutting system, namely anywhere in the hydraulic portion of the food cutting system between the discharge of the feed pump and the inlet to the barrel assembly. The pressure sensing transducer is used to monitor pressure transients generated by the impact of food product against the cutter blade array. Pressure transients, monitored within an empirically determined bandwidth, indicate the impingement of food product against a cutter blade array, its being cut, and the pieces passing therethrough. Signals generated by pressure transients above the empirically determined bandwidth are used to indicate the occurrence of an event wherein the food product impinged upon the cutter blade but did not pass completely through the cutter blade array and, as a result, created a system blockage.

A control system is provided that, upon the occurrence of such a pressure transient, activates a motor to rotate the cylinder to index into alignment within the system flow path, another barrel assembly containing a clean, unplugged cutter blade array.

The system further provides that, in the event that the system blockage does not clear, that is to say the pressure transient signals generated by the pressure transient sensing transducer do not return to the normal bandwidth after changing barrels, the cylinder is again rotated, this time to a barrel assembly containing no cutter blade assembly. This empty barrel assembly serves as a clean-out tube, which allows the passage of backed up food product in the system flow path to be cleared. A diversion valve is provided which, upon rotation of the cylinder to the clean-out barrel position, automatically closes to prevent the discharge of whole food product onto the dewatering conveyor. Instead, whole food product is diverted to a return line and holding chute above the feed tank where it can be either recycled back into the feed tank or removed if damaged.

BEST MODE FOR CARRYING OUT INVENTION

In it's simplest embodiment, the present invention can be retrofitted to existing hydraulic cutting systems. As previously stated in the prior art section of this specification, currently existing hydraulic cutters are capable of, and are routinely used for, cutting between 20,000 to 35,000 pounds of potatoes per hour. At this production rate, given an average potato weight of 10 ounces, an average of between 8.8 to 15.4 potatoes will impinge upon, be cut and pass through the cutter blade assembly each and every second during operation. As each potato impinges on the cutter blade assembly, for practical purposes it is instantaneously slowed down and thus presents a very quick transient blockage to fluid flow in the system. This in turn produces a transient pressure spike in that portion of the system that is operating under hydraulic conditions, namely from the discharge of the feed pump through the accelerator tube, the cutter blade assembly, and into a portion of the decelerator tube. These pressure transients travel through the hydraulic portion of the system at the speed of sound for the given medium or material through which it is passing, primarily through the pressurized water in the accelerator tube.

A pressure sensing transducer can be used anywhere within the hydraulic portion of the hydraulic cutting assembly to sense these pressure transients. Under normal operating conditions, as each potato impinges upon, is cut into pieces and passes through the cutter blade assembly, it will generate a pressure transient. These pressure transients can be empirically measured, and a range of normal pressure transients can be established.

When a potato or other food product impinges upon the cutter blade assembly and does not pass through, it presents a physical blockage to continued fluid flow through the pressurized portion of the hydraulic system. This results in a more extreme, or larger, pressure transient which will be of a greater magnitude than the normal pressure transients indicating the clean passage of potatoes through the cutter blade assembly. This signal can, in turn, be used as a control signal to stop the flow of potatoes or other food products through the plugged cutter blade assembly.

Figure 16:
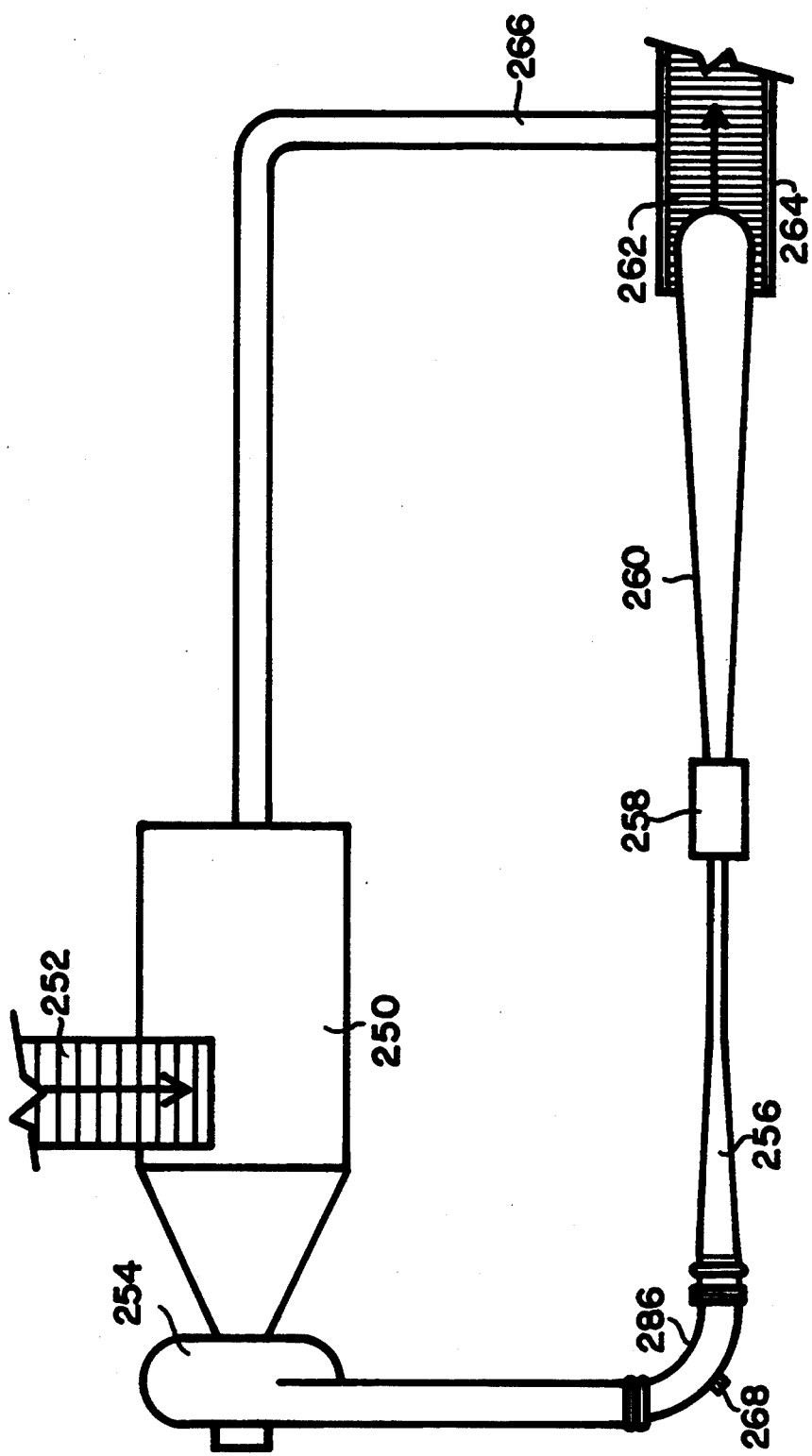
FIG. 16 is a representational schematic top plan view of a conventional hydro-cutting system adapted for use of the present invention.
Figure 17:
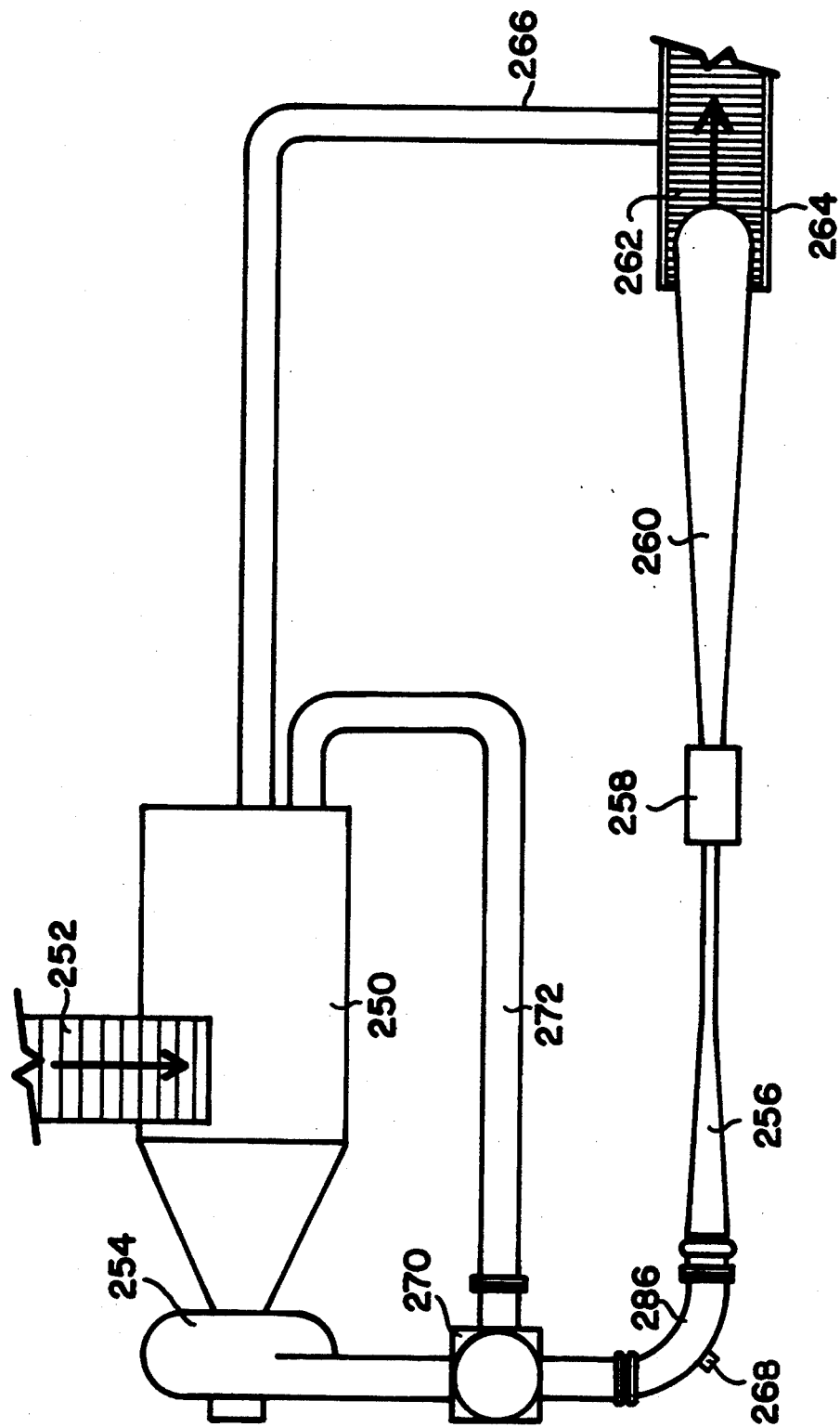
FIG. 17 is a representational schematic top plan view of a conventional hydro-cutting system adapted for use of the present invention, including a bypass return line.
Figure 18:
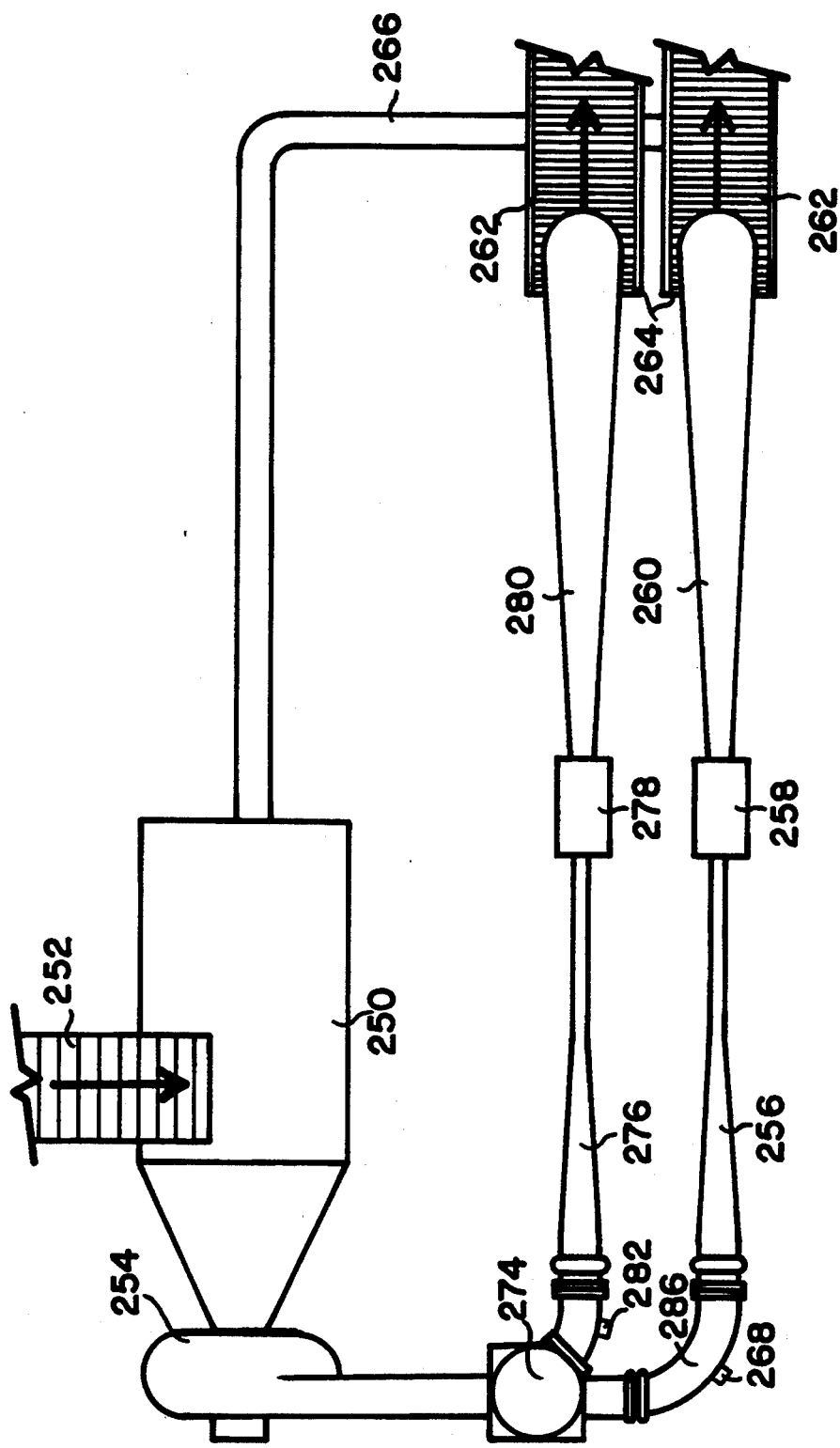
FIG. 18 is a representational schematic top plan view of a conventional hydro-cutting system adapted for use of the present invention, including a second conventional hydraulic food cutter device.

FIGS. 16, 17 and 18 disclose three preferred embodiments of the simplest implementation of the present invention. In FIG. 16, a conventional hydro-cutting system which utilizes an in-feed conveyor 252 for feeding bulk food product, in this case potatoes, into feed tank 250. Suction is drawn on feed tank 250 by hydraulic feed pump 254, which pumps a mixture of potatoes suspended in water through elbow pipe 286 into accelerator tube 256. A conventional hydro-cutting apparatus 258, of the type shown and described in my U.S. Pat. No. 4,911,045, the teachings of which are herein incorporated by reference, can then be used to position a cutter blade array in the pressurized fluid pathway. The water passes through the cutter blade array, and the potatoes impinge upon it. The potatoes are cut into pieces, and the pieces pass through the cutter blade array into decelerator tube 260. Decelerator tube 260 dumps the potato pieces and water onto dewatering conveyor 262. The water passes through dewatering conveyor 262 into water collection tray 264 and then into return line 266 which returns it to feed tank 250. The cut food pieces are carried off by dewatering conveyor 262 for further processing.

Pressure sensing transducer 268 is installed in the hydraulic portion of the hydro-cutting system. Generally speaking, this hydraulic portion extends from the pump discharge through the cutter blade array. By empirical testing it can be determined the appropriate bandwidth within which normal pressure transients will occur as the food products impinge upon and are cut by the cutter blade array contained within hydraulic cutter 258. The actual setting must be empirically determined, since each hydraulic cutting system is different. In addition, where the pressure sensor is located within the hydraulic portion of the hydro-cutting system is also important. The base line pressure will be highest at feed pump 254's discharge, usually in the range of 20 pounds and 30 pounds per square inch, and at its lowest at the cutter blades, which is at the narrowest part of the accelerator tube portion of the venturi. It has been found in practice that a location near the discharge of the pump is a good place to position pressure sensing transducer 268.

The reason why empirical testing is required is that there are a number of variables which make precalculation of pressure transients difficult, if not impossible. For example, when testing and measuring pressure transients in the hydraulic food cutter with automatic blade changers described in this Best Mode section, using a cutter head assembly configured to cut french fry pieces of 9/32 square inches from an average of 10-ounce potatoes, it was determined that the majority of the potatoes passing through the cutter blade assembly generate a pressure transient of approximately one pound over system pressure. On occasion, with larger than normal potatoes, or if two potatoes were closely spaced together, pressure transients of up to two pounds were generated. It was found that two-and-one-half pounds or more of over pressure was indicative of a potato not passing completely through the cutter head assembly, and thereby generating a partial plug. A complete plug and flow stoppage in the liquid flow pathway generated a six pound pressure transient. Once the normal band width pressure transients have been determined, an empirically determined set point can be selected for purposes of detecting a partial blockage of the system caused by a food product failing to pass cleanly through the cutter blade array. Once the pressure sensor detects a pressure transient above this empirically determined set point, a control signal, in the conventional manner, can be used to shut off pump 254, thus preventing a pile up of food product within the piping causing a pipeline blockage.

FIG. 17 discloses a second variant of the same embodiment which further includes diversion valve 270 in the discharge line for pump 254. In the second embodiment, when the pressure sensing transducer 268 detects an above-normal pressure transient, diversion valve 270 is activated to divert the discharge from pump 254 into diversion line 272, which recycles the water and suspended potatoes back to feed tank 250.

The third variant of the same basic embodiment is disclosed in FIG. 18, wherein a second hydraulic cutting apparatus 278 is provided, along with its associated accelerator tube 276 and decelerator tube 280. Diversion valve 274 is installed along with a second pressure transducer 282. In this embodiment, diversion valve 274 is activated by either the first pressure transducer 268 or second pressure transducer 282, whichever is in the operating hydraulic cutting system, to divert flow from the operating hydraulic cutter to the standby hydraulic cutter upon detection of an abnormally high pressure transient indicative of a partial blockage of the cutter blade assembly currently in use.

It should be pointed out that the term "water" is used as the liquid medium in which the food product is suspended. While it is not essential to the teachings of this specification, the actual fluid or liquid being used is usually water based, but may be with a solution of other chemicals, and will certainly include, in the case of potatoes, dissolved starches from the potatoes themselves. Other chemicals are often added, and in some cases the water is heat conditioned for optimum operation of the cutter assemblies.

Figure 1:
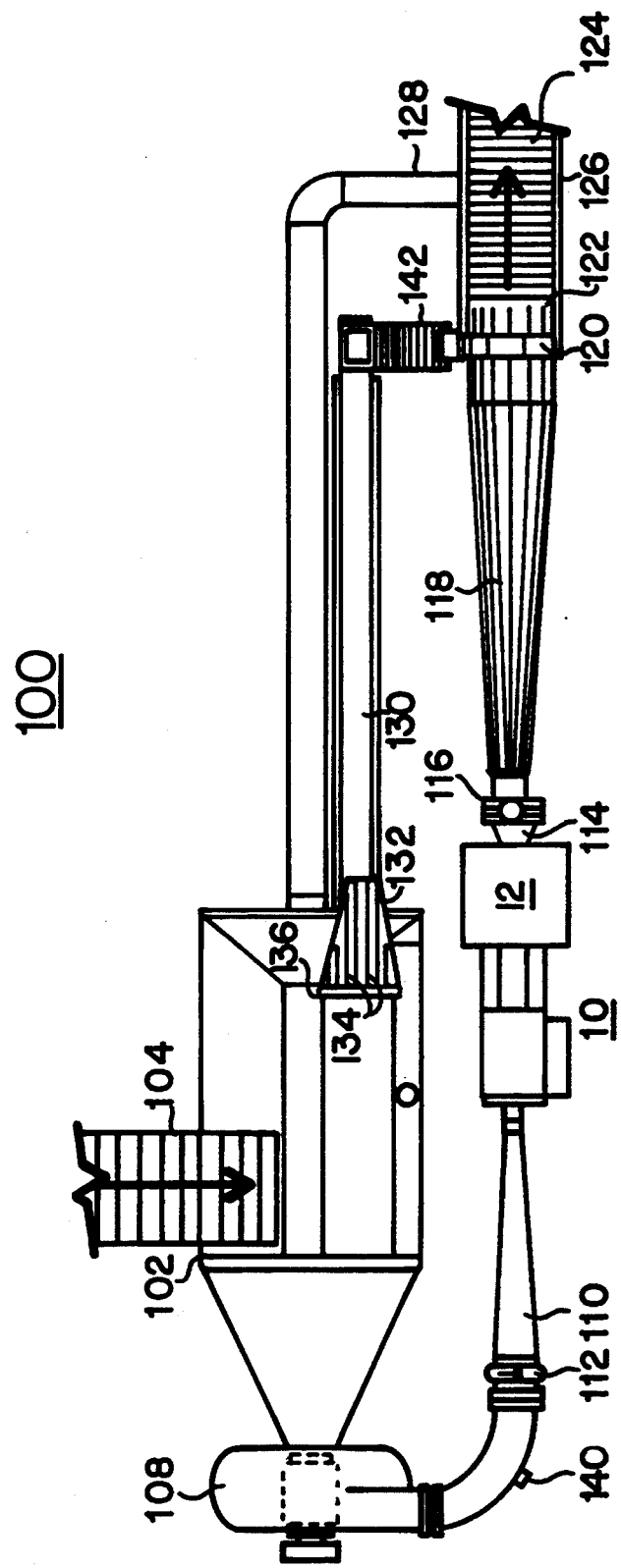
FIG. 1 is a schematic representational top plan view of a hydro-cutting system utilizing a hydraulic food cutter with automatic blade changer.
Figure 2:
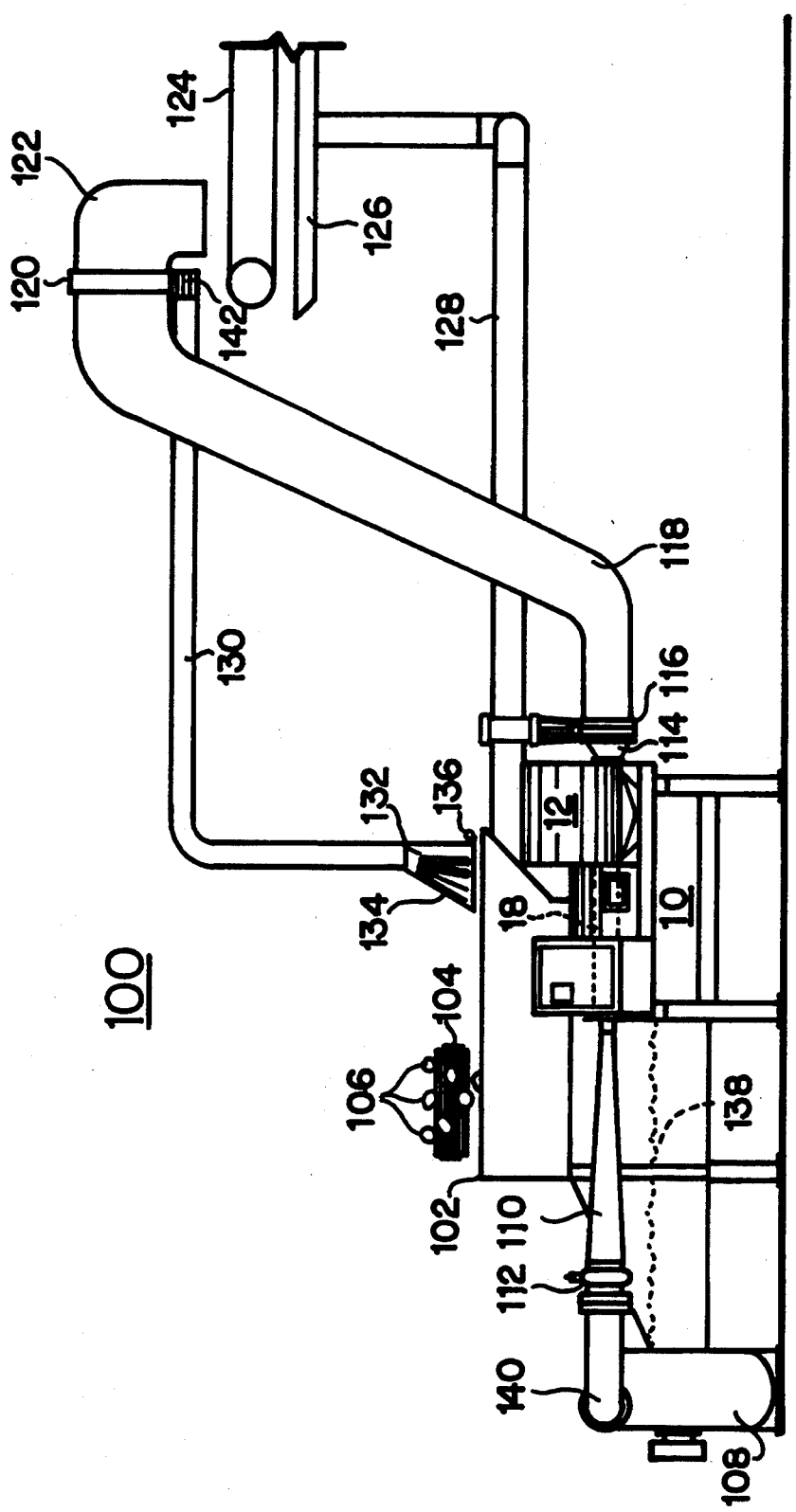
FIG. 2 is a schematic representational side view of a hydro-cutting system utilizing a hydraulic food cutter with automatic blade changer.

A more complex hydraulic cutting apparatus and system is shown and described in FIGS. 1 and 2. As can be seen in FIGS. 1 and 2, feed conveyor 104 conveys whole potatoes 106 to feed tank 102, where whole potatoes 106 are dropped into system water 138. The suspension of whole potatoes 106 in system water 138 is then pumped by means of food pump 108 through food pump isolation valve 112 into system accelerator tube 110 wherein, through the venturi effect of the converging system accelerator tube 110, whole potatoes 106 fall into seriatim alignment and are accelerated to velocities of between 40 and 60 feet per second.

Figure 3:
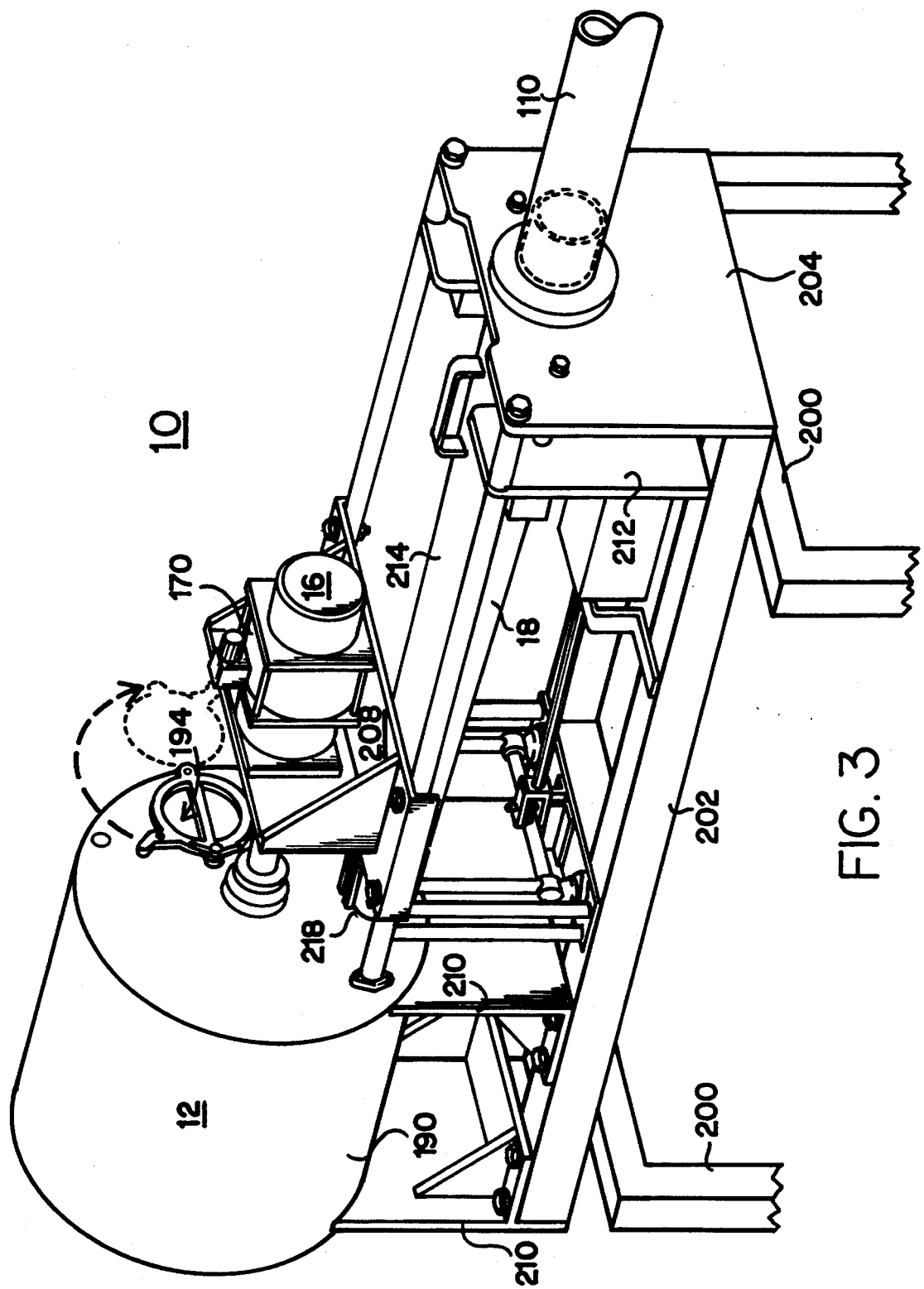
FIG. 3 is a perspective representational view of a hydraulic food cutter with automatic blade changer.
Figure 4:
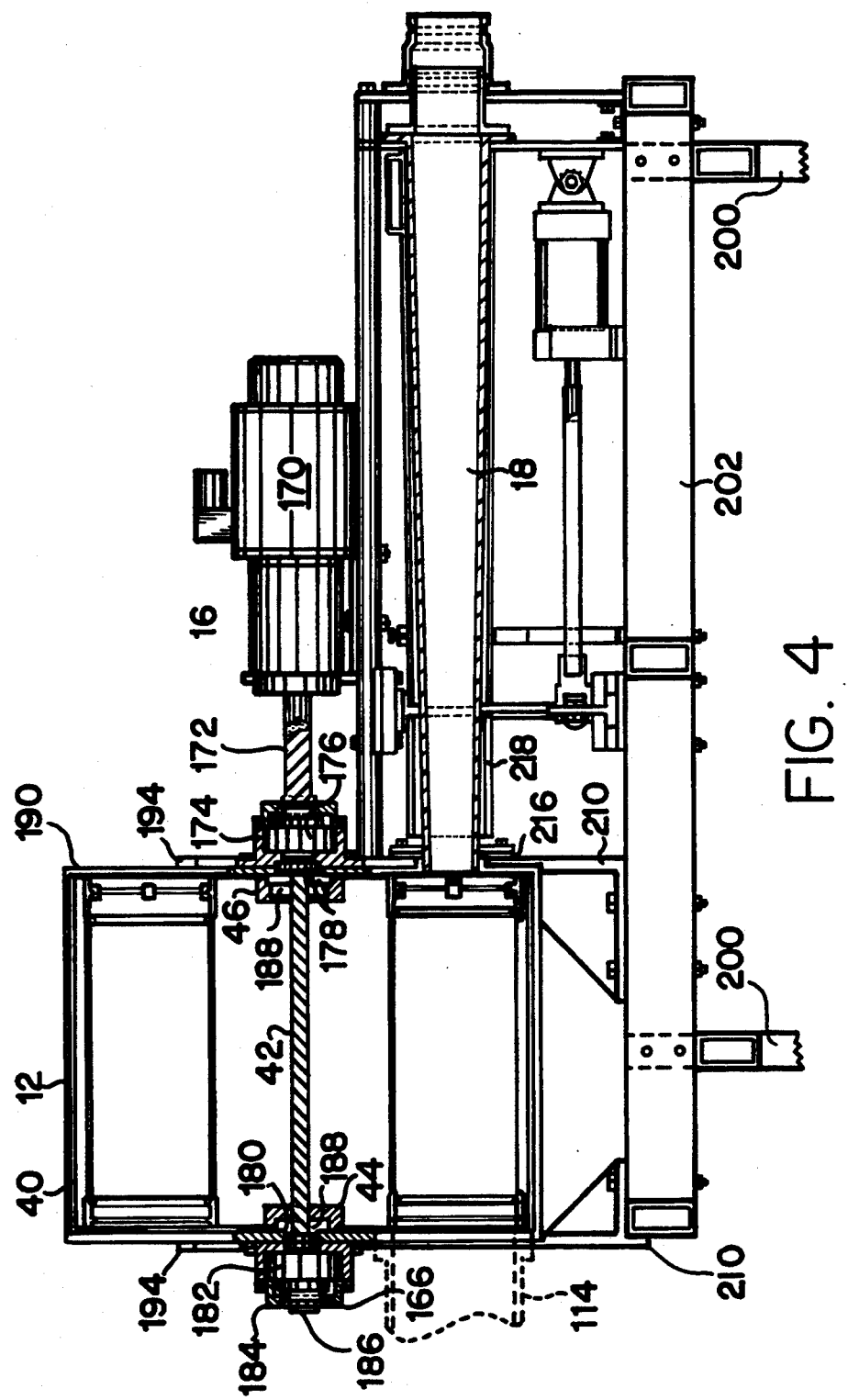
FIG. 4 is a sectional side view of a hydraulic food cutter with automatic blade changer.
Figure 5:
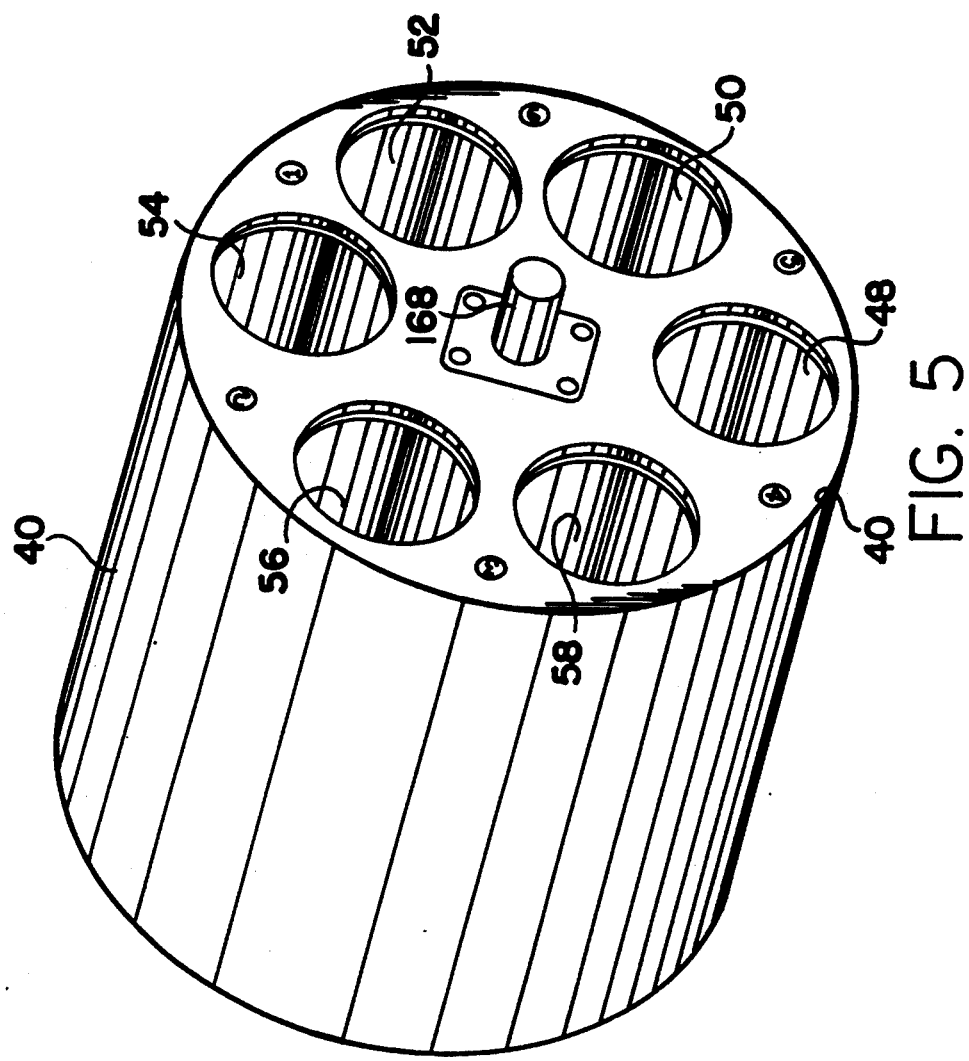
FIG. 5 is a perspective representational view of a barrel assembly.

As also shown in FIGS. 3 and 4, the fast moving whole potatoes 106 then enter alignment tube assembly 18 of hydraulic food cutter 10 where they then pass into cylinder assembly 12 which contains a plurality of barrel assemblies holding cutter blade arrays. The whole potatoes 106 impinge upon the cutter blades and are cut into a plurality of cut food pieces, which in this example, are french fry pieces. The system water and cut food pieces are discharged from hydraulic food cutter 10 through discharge tube 114 and discharge isolation valve 116 into decelerator tube 118. Decelerator tube 118 is generally formed in a diverging conical shape which functions as a deceleration portion of the system venturi and serves the function of slowing down the cut food pieces prior to their being deposited onto dewatering conveyor 124.

Decelerator tube 118 also elevates the discharged system water and cut food pieces so as to facilitate gravity feed return of system water and whole potatoes bypassed through the system as is later described in the specification. The discharged system water and cut food pieces pass through whole potato bypass valve 120 and cut food dump chute 122 and are dumped onto dewatering conveyor 124. The cut food pieces remain on dewatering conveyor 124 and are carried off for further processing. The discharged system water drains through dewatering conveyor 124 into system water collection tray 126 for return through system water return line 128 to feed tank 102.

Whole potato bypass valve 120 is provided for use in returning whole potatoes to feed tank 102 when a system plug occurs and the system flush-out barrel is indexed into position to unplug the system.

In normal automatic control operation, the cylindrical assembly 12 of hydraulic food cutter 10 is indexed to a barrel assembly containing a cutter blade assembly. As previously stated in this specification, between 8.8 potatoes to 15.4 potatoes per second, on average, will impinge upon, be cut, and pass through the cutter blade assembly during operation. It has been found that, as each potato impinges upon cutter blade assembly, for practical purposes it is instantaneously slowed down and thus presents a very quick transient blockage in the system to fluid flow. This in turn produces a transient pressure spike in that portion of the entire system that is operated under hydraulic conditions, namely from the discharge of feed pump 108 through at least the beginning of decelerator tube 118. These pressure transients travel through the hydraulic portion of the system at the speed of sound for the given medium or material through which it is passing, primarily through the pressurized water in the alignment tube assembly 18 and accelerator tube 110. This pressure is sensed by means of pressure sensing transducer 140 which, in the preferred embodiment, is located in the discharge piping of food pump 108. The signal sensed by pressure sensing transducer 140 is a relatively uniform series of pressure spikes, or transients of relatively uniform intensity or strength, which are occurring at the frequency at which whole potatoes are impinging and passing through cutter blade assembly.

If a whole potato fails to pass completely through the cutter blade assembly, it then presents a more long term, or permanent, blockage and, in the event that the next potato in the line fails to push the stuck potato and itself through, this will result in a significant blockage to fluid flow, and, as a result, a significant increase in system pressure.

If this increase in system pressure is sensed quickly enough, a signal is generated through the control system, to activate cylinder motor assembly 16 to rotate cylinder assembly 12 to index another barrel assembly into the system flow line which contains an unplugged cutter blade assembly so that system operation can continue uninterrupted.

This operation must be completed quickly in that potatoes are being accelerated and sent down the alignment tube at the rate of between 8.8 potatoes per second to 15.4 potatoes per second. In practice, in the preferred embodiment, it has been found that if the barrel assemblies can be reindexed within approximately 250 msec. the system will not plug, and the whole potatoes queuing up in front of the cutter blade assembly will still have sufficient energy, and the system flow rate will be high enough, to pass these potatoes through the cutter blade assembly. While no actual test data has been observed as of yet, it is also suspected that temporary blockage causes an abrupt decrease in flow rate of suspended potatoes in the accelerator tube, which would itself have a beneficial effect in preventing formation of a blockage if the barrel assemblies can be changed quickly enough.

Obviously, the quicker that barrel assemblies can be reindexed or changed, the better. Also, the speed at which barrel assemblies have to be reindexed is dependant upon the rate at which potatoes are accelerated and pass through alignment tube assembly 18. If the system is being operated at a rate of 10,000 pounds per hour as opposed to 20,000 pounds per hour, potatoes will be impacting the cutter blade assembly at a much lower interval or frequency, and more time will be available to index a new, unplugged barrel assembly into the system flow path. In practice, at the current generally accepted rates of 20,000 to 35,000 pounds per hour, a 250 msec. changeover time for barrel assemblies should be commercially acceptable.

It is possible that the reindexing of a clean unplugged barrel assembly into the system flow path will not occur quickly enough for conditions and, even after the unplugged barrel assembly is indexed into the system flow path position, a plug of queued potatoes will not push through the cutter blade assembly. In the past, this would necessarily result in a shut down of the system and a disassembly of the accelerator and alignment tubes to manually remove the blockage of partially mashed and smashed potatoes. However, the present preferred embodiment provides an alternative to this, namely a barrel assembly within cylinder assembly 12 which does not contain a cutter blade assembly or venturi insert. This assembly, the clean-out barrel assembly, is used in conjunction with decelerator tube 118 and whole potato bypass valve 120 to automatically flush out a whole potato plug or blockage.

In the preferred embodiment, in operation, in the event pressure sensor 140 detects the initiation of system blockage in a barrel assembly containing a cutter blade assembly, it will cause cylinder motor assembly 16 to energize, thereby rotating cylinder assembly 12 to index the next programmed barrel assembly containing a cutter assembly. If pressure sensor 140 does not detect an immediate reduction in pressure, indicating the clearing of the blockage by the passing of the temporarily queuing potatoes through the clean cutter blade assembly, then cylinder motor assembly 16 again energizes and rotates cylinder assembly 12 to index the clean-out barrel assembly into alignment with the system flow path, and whole potato bypass valve 120 is repositioned to divert discharge flow from cut product dump chute 122 to whole potato bypass conveyor 142.

At this point, and in this configuration, system water being pumped by food pump 108 is used to dislodge the blockage of whole potatoes and to convey them through the clean-out barrel assembly, and whole potato bypass valve 120, onto whole potato bypass conveyor 142 where they are conveyed into whole potato return line 130. The whole potatoes and system water pass through whole potato return line 130 and into whole potato holding chute 132. The holding chute is provided with a plurality of drain and observation slots 134, and a holding chute dump valve 136, which is normally in a closed position. In this manner, the potatoes which caused the blockage, and which were possibly damaged in the process, are held out of the system for inspection prior to being reintroduced into feed tank 102. Simultaneous with the initiation of the whole potato clean out cycle, feed conveyor 104 is shut down to stop the introduction of additional potatoes 106 into feed tank 102. If the system is run in the flush out cycle long enough, eventually all of the potatoes 106 contained in feed tank 102 will be collected in holding chute 132. This feature can be used for a variety of purposes in addition to just cleaning out a plug of whole potatoes. It could be used to collect potatoes in the system prior to end of shift clean out or even to temporarily hold whole potatoes while system water is changed or its chemistry is adjusted.

A second, and equally important feature, of the present invention is that it enables automatic replacement of cutter blade assemblies on a periodic basis during continuous uninterrupted operation. In the present preferred embodiment, provision is made within the control circuits to automatically change barrel assemblies containing replacement cutter blade assemblies on a periodic basis, for example every 2, 3 or 4 hours. Thus, the present preferred embodiment will, over time, produce a higher quality cut food product than was possible with the prior art machines.

Figure 6:
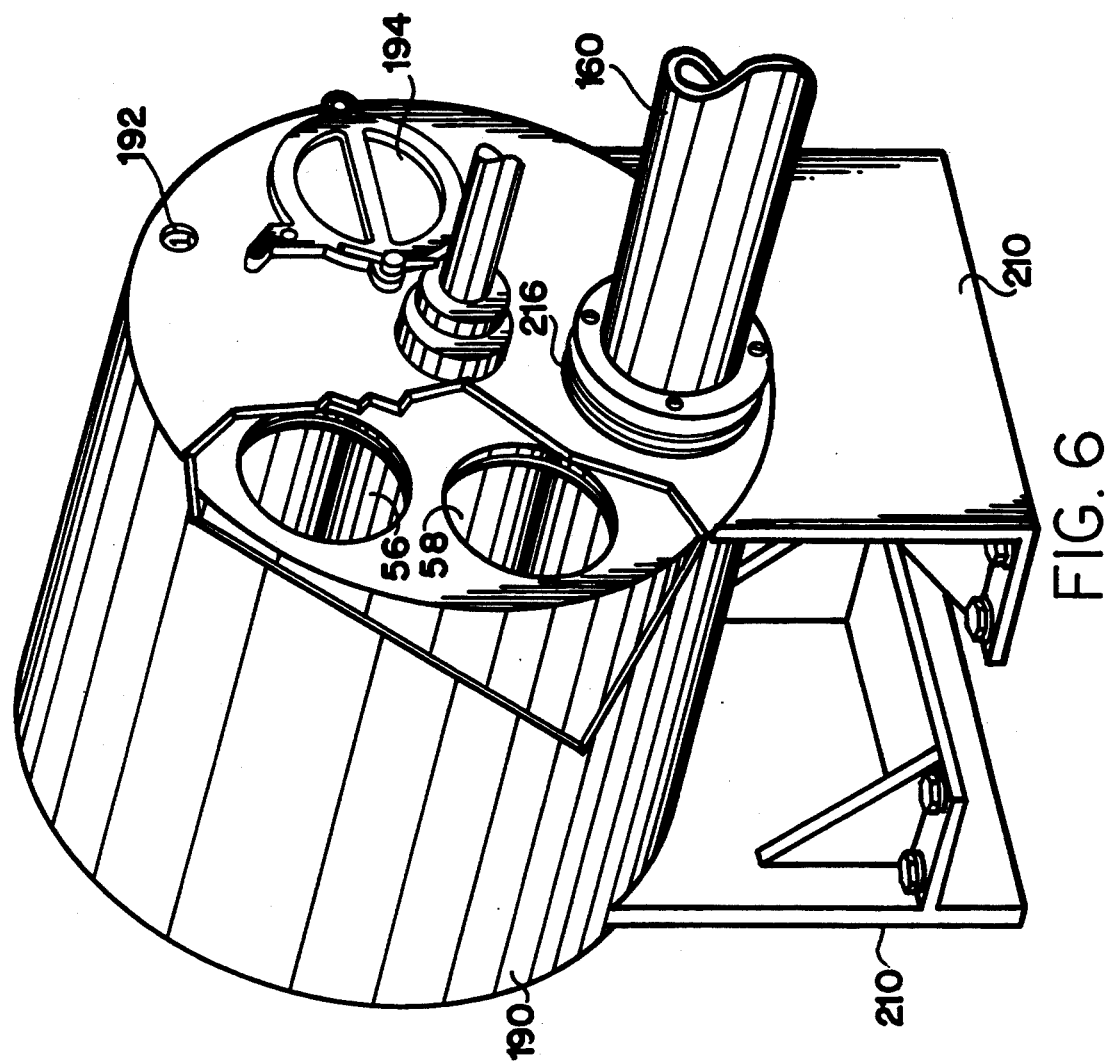
FIG. 6 is a perspective representational view of a cylindrical barrel assembly with cylindrical housing.
Figure 7:
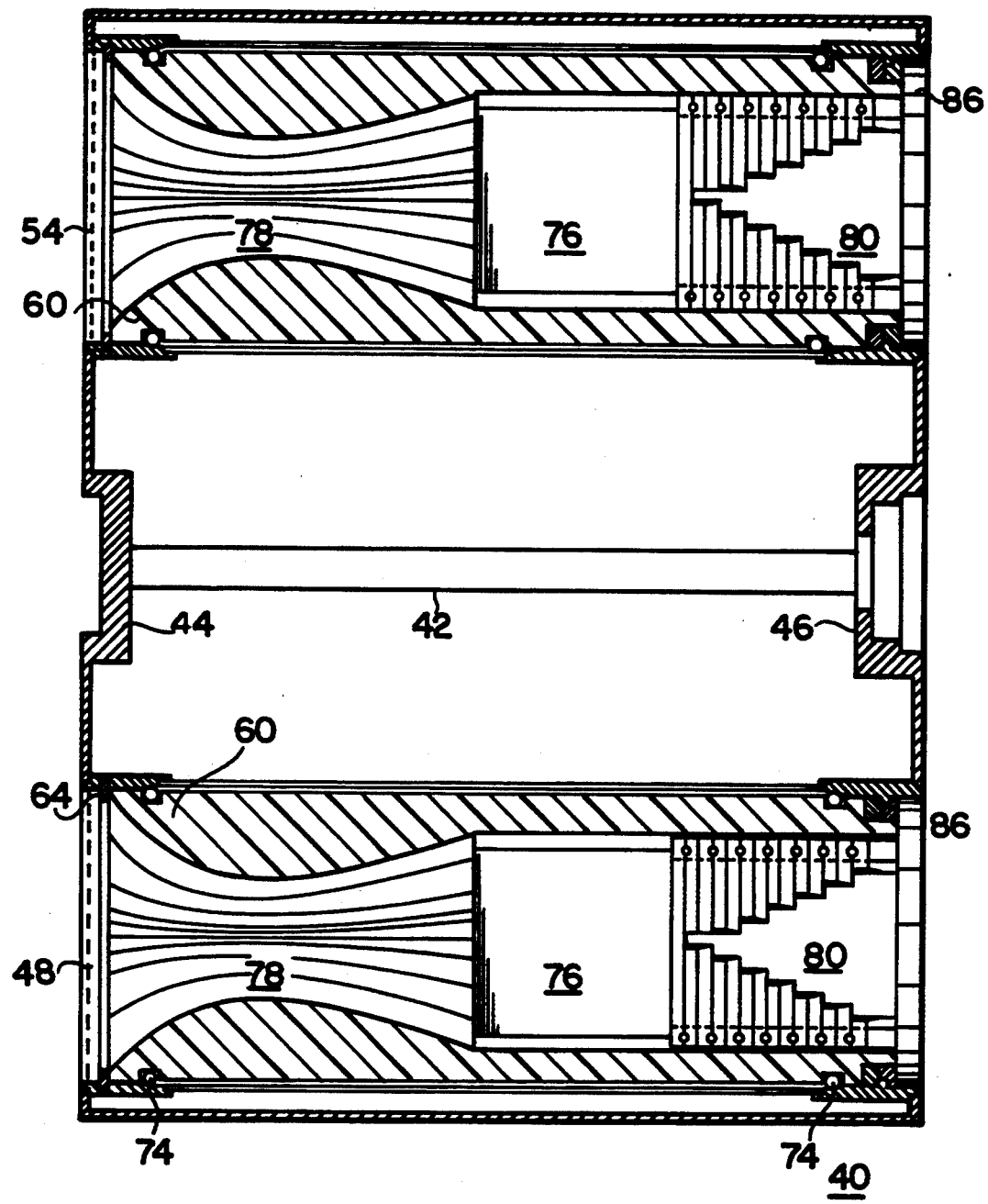
FIG. 7 is a sectional side view of the cylinder and barrel assembly.

The general component assemblies of my new hydraulic food cutter with automatic blade changer 10 can be seen in FIGS. 3, 4, 5, 6, 7 and 8. First referring to FIGS. 3 and 4, a pair of main support braces 202 are held in parallel relationship atop a pair of frame stands 200 which are height adjusted to ensure proper alignment of the alignment tube and barrel assembly with the system flow path. Cylinder assembly 12 contains cylinder 40 which has a plurality of barrel assemblies 48, 50, 52, 54, 56 and 58 disposed therethrough. As seen in FIG. 7, cylinder 40 is formed of hollow stainless steel which has cylinder internal axle shaft 42 affixed to front shaft receiving block 46 and rear shaft receiving block 44. As can be seen in FIGS. 4 and 6, cylinder 40 is encased within stationary outer housing 190, which is supported atop main support braces 202 by means of cylinder cradle frames 210. Observation port 192 is provided to give the operator the ability to view indexing numbers for each barrel assembly so that the operator may verify which barrel assembly has been indexed into alignment with the liquid path flow coming from the discharge of the alignment tube. Indexing numbers and alignment markers are provided on the end surface of cylinder 40 so that they can be viewed through observation port 192. This manual indexing verification system is also useful when manually indexing a new barrel assembly into alignment with the liquid flow path.

Two access doors 194 are incorporated into outer housing 190 so as to enable the operator to access simultaneously both the inlet and outlet ends of a barrel assembly for routine replacement of cutter blade array assemblies 80 and venturi inserts 60, as the case may be.

Cylinder 40 and its attendant barrel assemblies are supported for rotational movement within outer housing 190 by means of front and rear bearing assemblies. Stepping motor and gear drive 170 provides rotational power through motor shaft 172 and the front bearing assembly. The front bearing assembly has a sealed outer housing 174 attached to cylinder housing 190, and a self-aligning bearing assembly 176, which is attached to a coupling shaft extension 168 held in shaft receiving block 46. Inner and outer oil seals 178 are provided, to complete the front bearing assembly.

In a like manner, the rear bearing assembly includes a rear bearing outer housing assembly 184 containing self-aligning bearing assembly 182. In a like manner, outer and inner oil seals 180 are provided, along with coupling shaft extension 166 held for rotation within rear cylinder bearing block 44. However, instead of coupling to the motor shaft, the rear bearing housing is provided with a handle socket 186 for receiving a manual crank handle for turning the drum in the event the motor power is lost. The manual crank handle is not shown. The purpose of coupling shaft extensions 168 and 166 is to provide support for drum 40 when the bearing assemblies are removed for repair or replacement.

Figure 8:
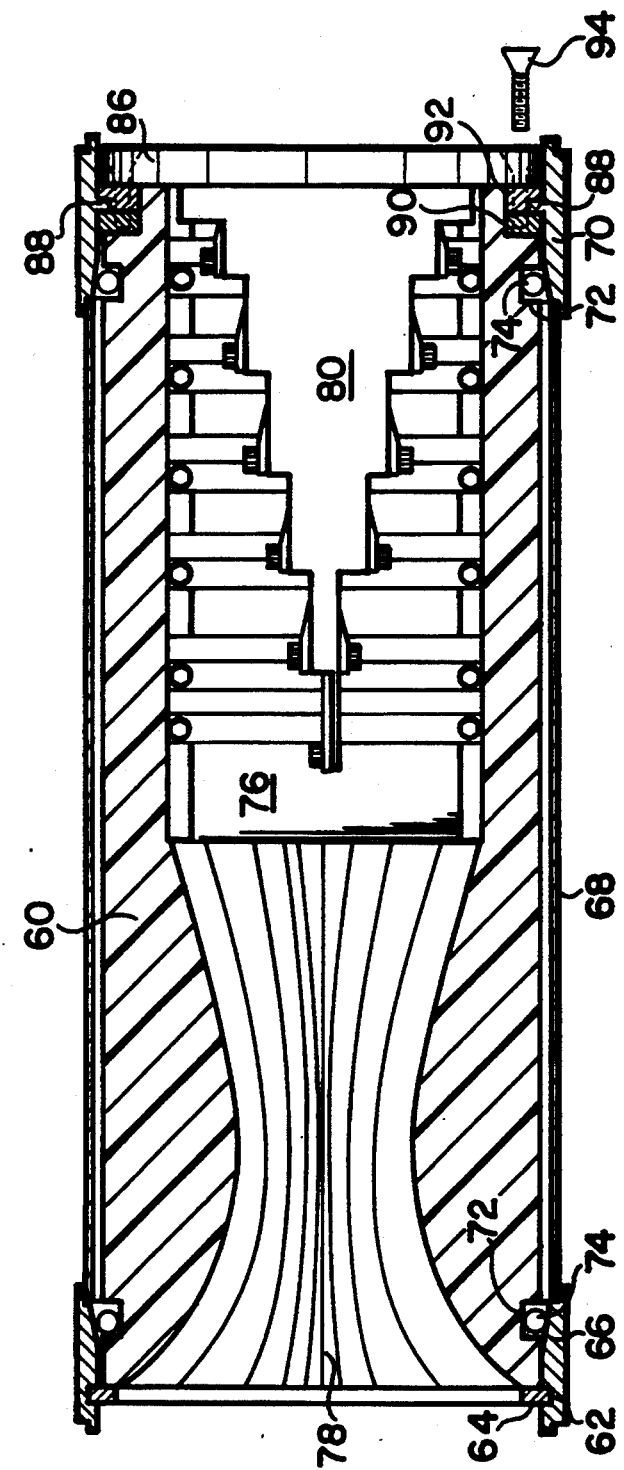
FIG. 8 is a sectional side view of a barrel assembly.
Figure 9:
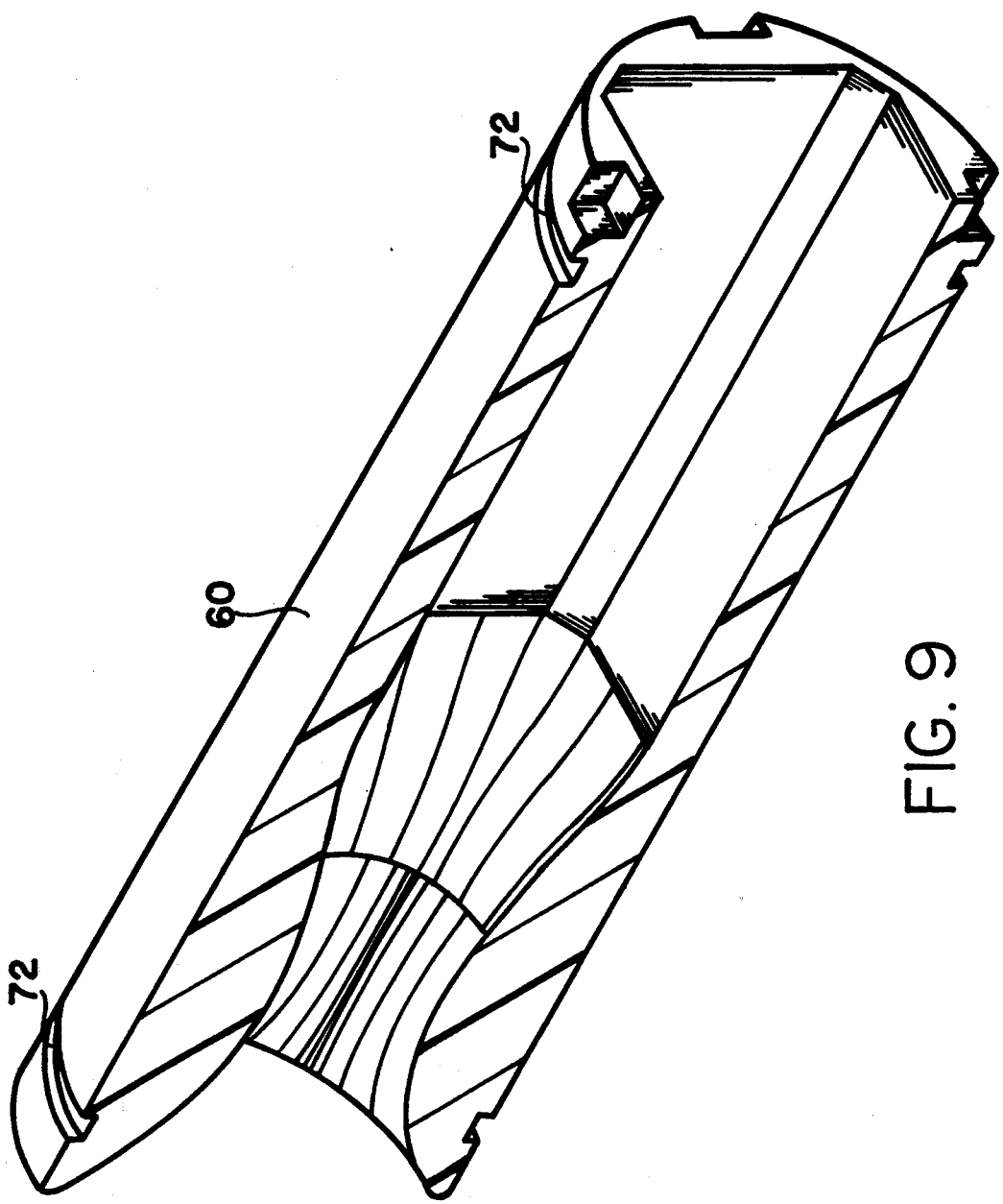
FIG. 9 is a perspective sectional view of a venturi insert.
Figure 10:
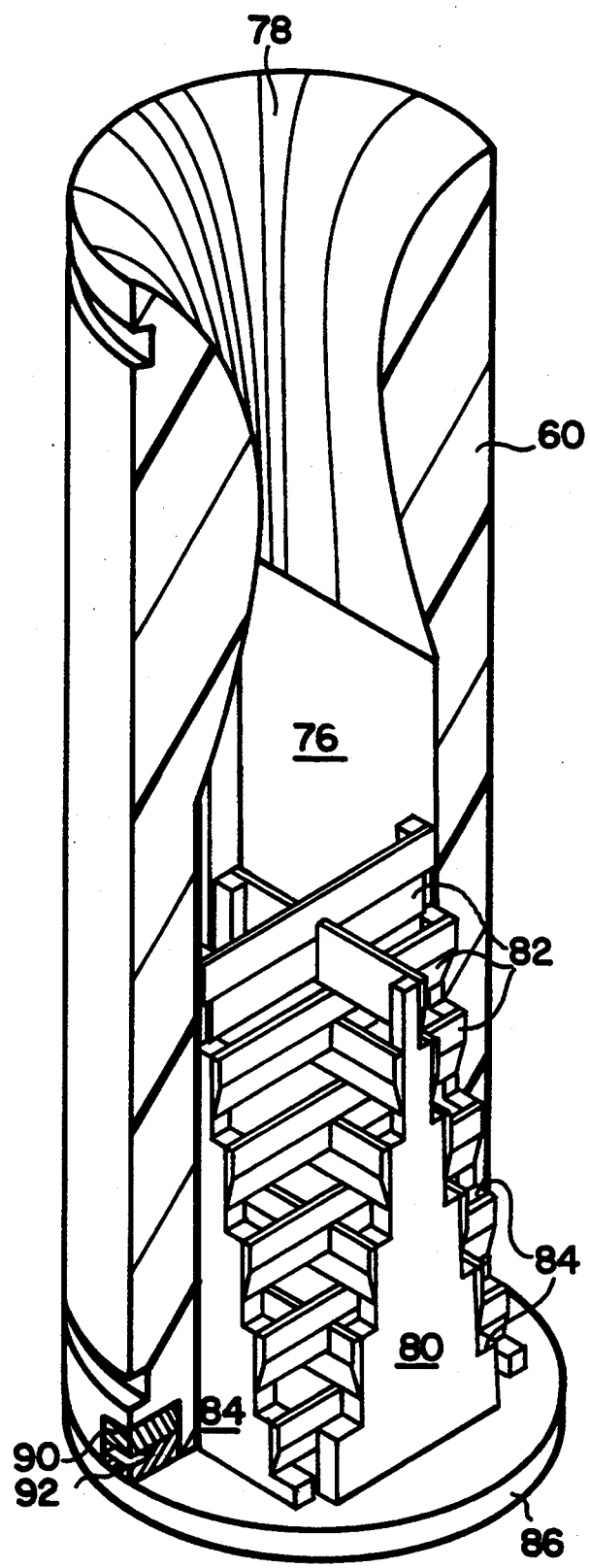
FIG. 10 is a perspective representational view of a cutter blade assembly in the venturi insert.

Referring now to FIGS. 7 and 8, cross-sectional drawings of a barrel assembly module are shown. The barrel housing is formed of three pieces: cylindrical housing 68, upstream blade holder collar 70, and downstream barrel collar 66, which are each formed and machined separately and then welded together for ease of manufacture. Venturi insert 60, as shown in FIGS. 7, 8, 9 and 10, is formed of molded high-molecular weight polypropylene and provides a blade holder chamber 76 at its upstream end and a venturi shaped passageway 78 at its downstream end. The material from which the venturi insert is made is not critical, most food grade plastics and metals with sufficient wear characteristics could be used. Venturi 78 in the downstream end of venturi insert 60 provides for a further pressure reduction immediately downstream of cutter blade assembly 80 and is used to reduce the possibility of plugging cutter blade assembly 80 during use. The use of venturi 78 within or positioned immediately downstream of cutter blade assembly 80 is also shown and described in my U.S. Pat. No. 4,807,503, the teachings of which are herein incorporated by reference. Cutter blade assembly 80 can be formed in a variety of configurations. In general, cutter blade assemblies are provided with a plurality of stationery cutter blades which are affixed to a frame assembly. The cutter blade assembly 80 of the present invention is shown to advantage in FIG. 10. It provides a plurality of stationary cutter blades or strip knives 82 which are attached to pyramidal knife supports 84 which themselves in turn are attached to circular inlet adapter ring 86, as is shown in FIG. 10. The specifics of cutter blade assembly construction and theory are shown and described in much greater detail in my U.S. Pat. Nos. 5,058,478, 5,095,794 and 5,125,308, the teachings of which are herein incorporated by reference.

As shown in FIGS. 7 and 8, assembly of barrel assembly 48 starts with the formation of the outer barrel formed of barrel cylinder 68, downstream barrel collar 66 and upstream barrel collar 70. These are welded together. The completed barrel assembly is welded into the ends of cylinder 40 to a water tight cylinder assembly.

Into the barrel assembly is inserted venturi insert 60. Venturi insert 60 is provided with a pair of O ring seals 74 interfitting into seal ring grooves 72 in venturi insert 60. The purpose, as shown in FIGS. 7, 8 and 9, for O ring seal 74 is to keep the relatively small dimensional space between venturi insert 60 and the barrel assembly formed of downstream collar 66 cylindrical barrel 68 and upstream blade holder collar 70, relatively dry and free of water and contaminants so as to reduce, and hopefully eliminate the development of any microorganism contamination within the machine.

Venturi insert 60 is held in place at its downstream end by means of venturi snap ring 64, which interfits and is held in position within venturi snap ring groove 62 which is formed integral into downstream barrel collar 66. Snap ring 64 is the means which prevents venturi insert 60 and cutter blade assembly 80 from pushing out the downstream end of the completed barrel assembly during use.

At the upstream end of the barrel assembly, there is a need to hold cutter blade assembly 80 firmly in place, yet still provide for quick removal and replacement for sharpening and cleaning purposes. This is accomplished by use of upstream blade holder collar 70 which has formed integral therewith, as shown in FIGS. 7 and 8, retaining flange extensions 88, and a pair of retaining lug sets, venturi retaining lugs 90 and blade holder retaining lugs 92, which are held firmly together and clamped in interfitting relationship with retaining flange extensions 88 by means of retaining lug screws 94. These sets of retaining lugs together lock the upstream end of venturi insert 60 in place within the barrel assembly, and provide mounting points to which inlet adapter ring 86 of cutter blade assembly 80 can be attached by means of retaining lug screws 94.

In the preferred embodiment of assembly, cutter blade assembly 80 and even venturi insert 60 can easily be removed and reloaded simply by gaining access to the end of the cylinder assembly 12, by means of access doors 194, and the use of simple hand tools.

Figure 11:
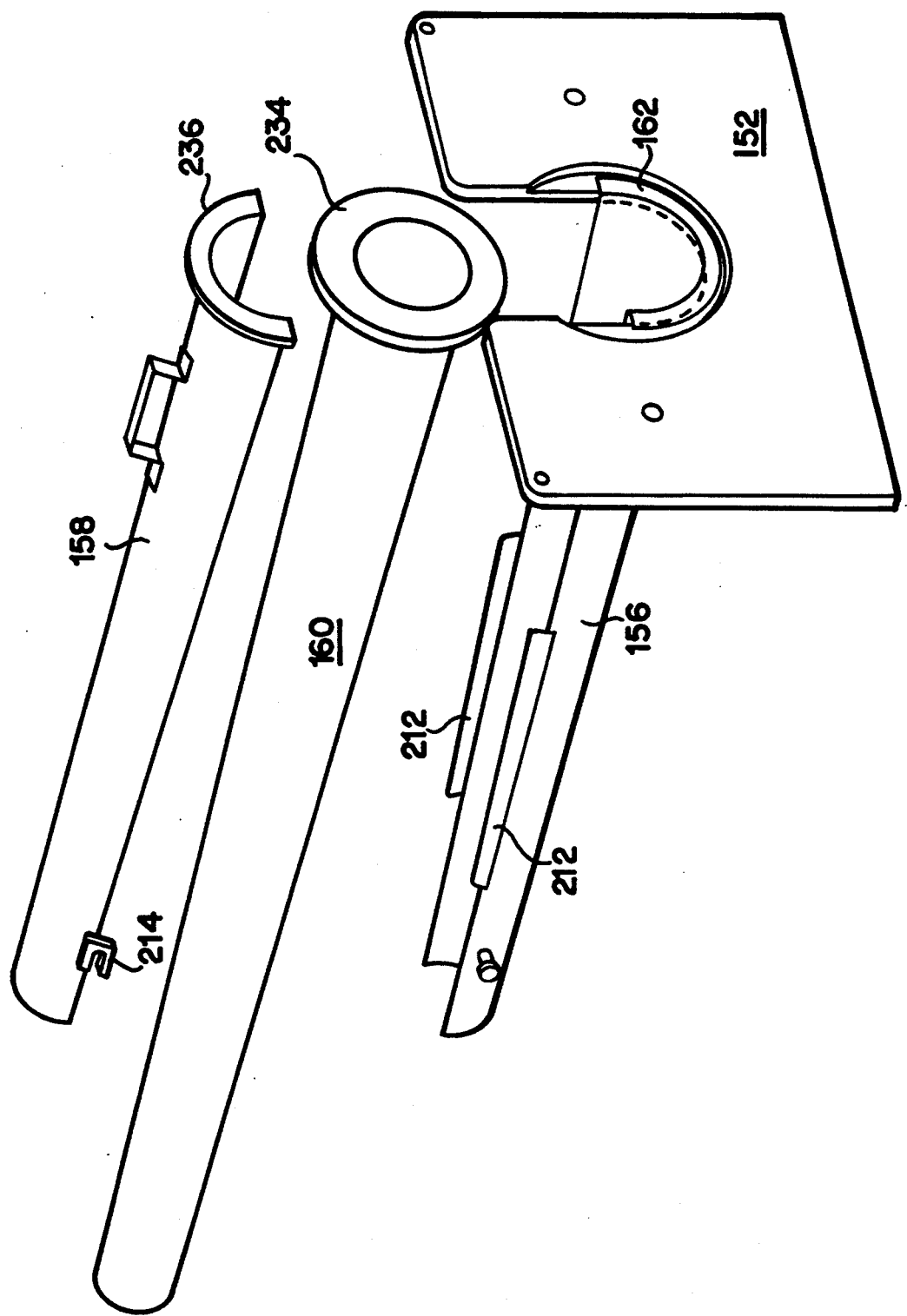
FIG. 11 is an exploded perspective representational view of an alignment tube assembly.
Figure 12:
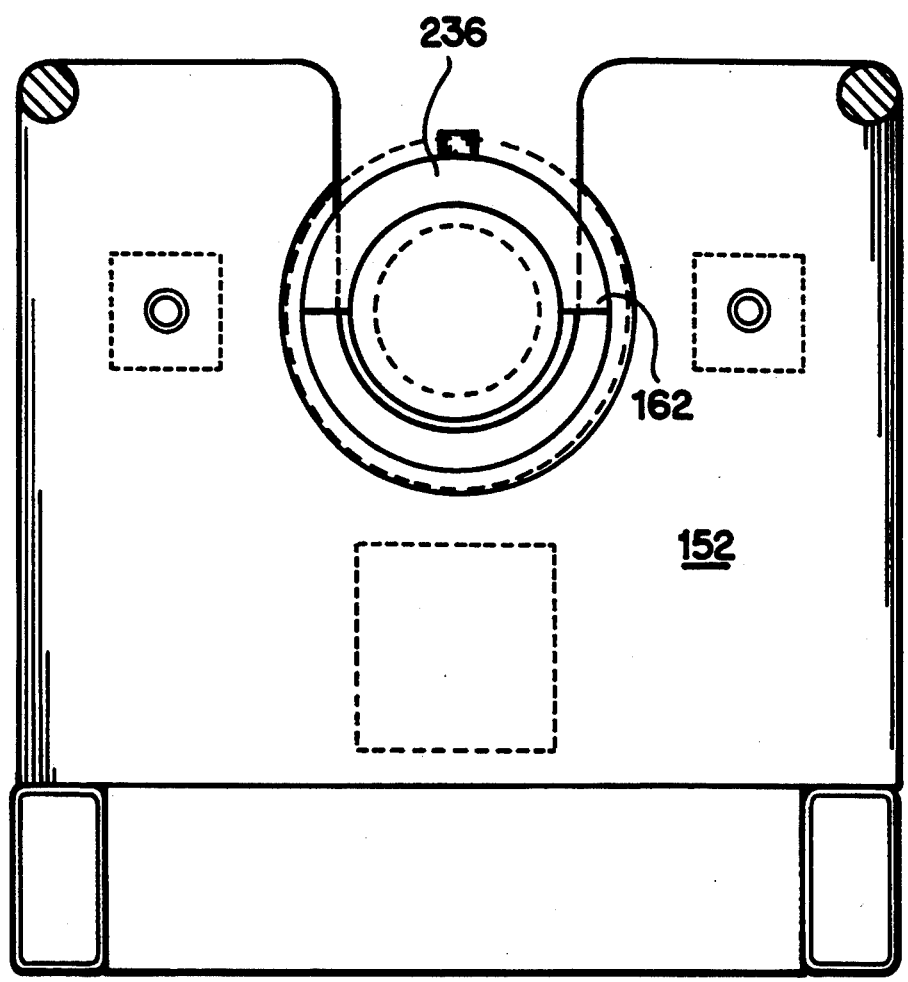
FIG. 12 is a side view of the alignment tube support plate.
Figure 13:
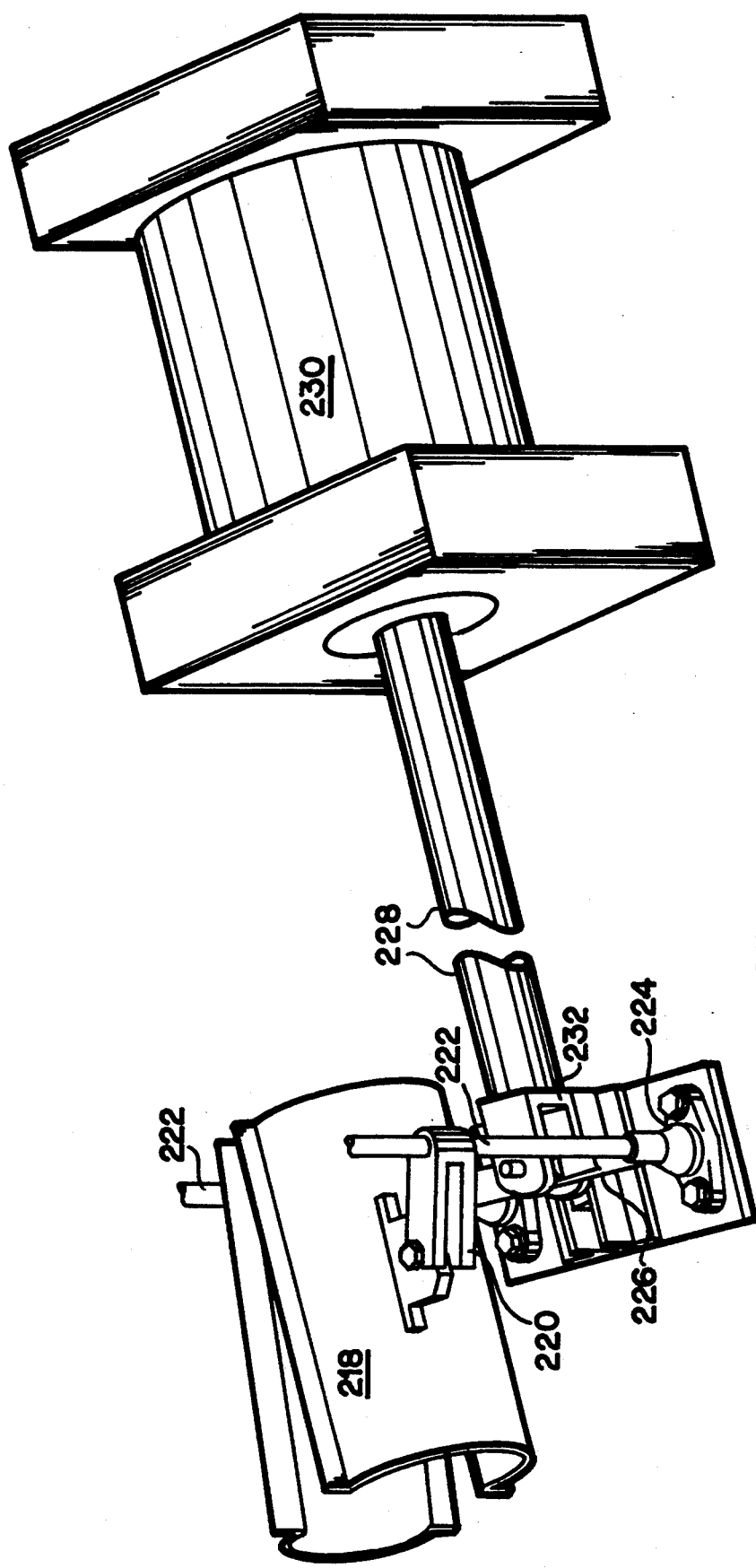
FIG. 13 is a perspective representational view of the alignment shoe assembly.

The alignment tube assembly of the preferred embodiment is also unique and features distinct advantages over the prior art. In the prior art hydro-cutting systems, alignment tubes were hard plumbed into the accelerator tube portion of the system. Repair, replacement or unplugging were, as previously described in the prior art section, usually accomplished by disassembly of the system components. As shown in FIGS. 6, 11 and 12, in this present preferred embodiment, alignment tube 160 is formed of resilient material, usually plastic or rubberized plastic. It is a converging conical shape and is provided with an integrally formed flange 234 at its larger end. When properly installed, as shown in FIG. 4, the smaller, converging end of alignment tube 160 interfits through gasket assembly 216 attached to outer housing 190 in a position for alignment with the center line of an indexed barrel assembly. The converging end of gun tube 160 interfits through the resilient gasket assembly 216 and is held in place and sealing is accomplished by frictional engagement between the gasket and the alignment tube. In practice this has proven to be sufficient, since at this most convergent end of the accelerator tube and alignment tube convergence, system pressure is reduced to something between a few ounces and a few pounds positive pressure.

The alignment tube is generally supported, along most of its length, by means of lower alignment tube housing 156 which is positioned and attached to alignment tube support plate 152 so as to cradle alignment tube 160 and hold it in place during operation. Alignment tube flange 234 interfits into alignment tube flange insert groove 162 in alignment tube support plate 152. An upper alignment tube housing cover 158 is provided to complete the alignment tube housing assembly. It is held in registration with lower alignment tube support housing 156 by means of alignment tabs 212 attached to lower housing 156 and locked in place by means of alignment clamps 214. At the upstream end of upper alignment tube housing cover 158 is attached alignment tube collar 236 which also interfits within alignment tube flange notch 162 to provide a positive circumferential clamp around alignment tube flange 234.

As shown in FIGS. 3, 4 and 11, the most convergent end, the downstream end, of alignment tube 160, is not encased with alignment tube lower and upper covers 156 and 158, but instead is retained in position by means of a pair of opposing alignment shoes 218. These shoes are mechanically interlocked together so as to equalize outward displacement when a food product, such as a potato, passes through the convergent end of alignment tube 160 and into a barrel assembly. This serves a function of allowing the use of the smallest possible diameter alignment tube 160 which in turn results in superior centering of the potatoes passing into the barrel assembly at maximum speed. The mechanical interlocks between alignment shoes 218 are known in the art and play no particular part in the invention other than they have been incorporated into this preferred embodiment. Mechanical interlocks utilize a shoe pivot arm 220 pivotally connected to an alignment shoe 218. Each shoe pivot arm 220 is rigidly attached to a vertical shoe pivot shaft 222 which is vertically oriented and pivotally attached to adjustment shoe base plate 224. A pair of equalizer shafts 226 also extend radially out from pivot shafts 222 for angular rotation when the corresponding alignment shoe is displaced either outward or inwardly. This angular travel of equalizer shaft 226 is transferred through pivotal connector yoke 232 to the other corresponding equalizer shaft. Thus, a displacement of one pivot shoe 218 will result in equal and opposite displacement of the second pivot shoe. Tension to keep pivot shoes 218 in compression against the convergent end of alignment tube 160 is provided by means of air cylinder 230 and air cylinder shaft 228 being attached to pivot yoke 232. It provides a constant force on the pair of equalizer shafts 226 so as to keep alignment shoes 218 in compression against the convergent end of alignment tube 160 at all times.

Figure 15:
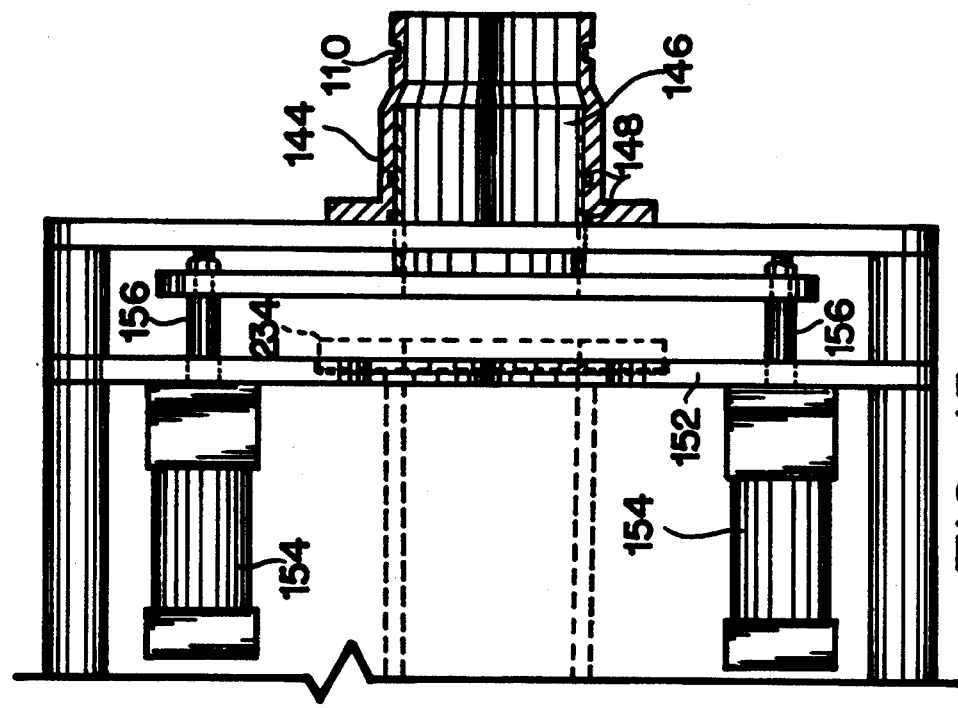
FIG. 15 is a sectional top view of the alignment tube sealing sleeve assembly in the unsealed position.
Figure 14:
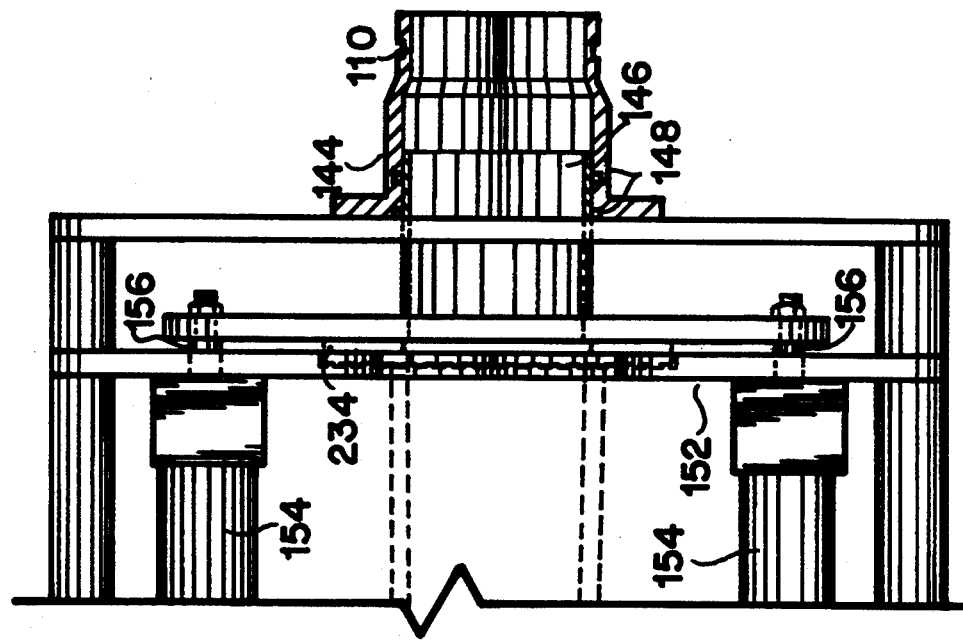
FIG. 14 is a sectional top view of the alignment tube sealing sleeve assembly in the sealed position.

As previously stated, alignment tubes such as alignment tube 160 were, in the prior art, hard plumbed into the hydraulic system. However, as shown in FIGS. 4, 14 and 15, the present invention incorporates a feature which seals the upstream end against leakage by means of a pair of air cylinders 154 pulling alignment sealing sleeve 146 into compression against alignment tube flange 234 thus providing a water proof seal. As can be shown in FIGS. 14 and 15, attached to the end of system accelerator tube 110 is sleeve housing 144. Sleeve housing 144 is sized to allow slidable insertion of alignment tube sealing sleeve 146. Water seal is provided by means of a pair of sealing sleeve O rings 148.

Air cylinders 154 are attached to ceiling sleeve 146 by means of air cylinder shafts 156. In operation, air cylinders 154 provide a position compressive force for sealing sleeve 146 against alignment tube flange 234. When it is desirable to remove alignment tube 160 either for repair or replacement, all that needs to be done is to relieve the compressive force provided by air cylinders 154 so as to insert sealing sleeve 146 into sealing sleeve housing 144. Next, upper alignment tube housing cover 158 is slid outward from interfitting engagement within alignment tube flange retaining notch 162, and lifted up and out to provide access to alignment tube 160. Thereafter, alignment tube 160 can easily and conveniently be removed and replaced.

The electrical and electronic control systems for the hydraulic food cutter with automatic blade changer is of conventional design and similar to control systems used on many machine tools. The pressure sensor used in the preferred embodiment provides an output voltage of between one and five volts DC corresponding to pressure changes. The DC output is used as a control signal for activation of an electrical relay which in turn is used to energize a microprocessor which controls stepping motor 170. A feedback loop from the stepping motor is provided to the microprocessor to insure that the motor has rotated the correct amount to index the next programmed barrel assembly.

The microprocessor provides controls for automatic, scheduled head changes, the sequence in which barrel assemblies are indexed into position, and finally a time delay for the pressure transducer.

The time delay circuit is significant for a number of reasons. First, it shuts off the pressure transducer during barrel assembly changes, either routine, time-scheduled changes, or changes induced as a result of a system blockage. Secondly, it is used to monitor whether or not a barrel assembly change was effective in clearing a partial blockage. For example, in the experimental tests previously described in this specification, the trip point for the relay to turn on was set at a pressure transducer output voltage equivalent to two-and-one-half pounds over pressure. The transducer time delay is set at the minimum amount of time required for the transducer to reset itself to a no over pressure condition in the event that the transient has cleared itself. Once the cylinder has indexed a new, clean barrel assembly into the system flow path, and the time delay has expired and the pressure transducer has reset to a no over pressure transient condition, then normal operations will continue. However, in the event that, after the time delay and the indexing of a new, clean cutter head, the pressure transducer has not reset to a no over pressure transient condition, the microprocessor will again deactivate the pressure transducer, then activate the stepping motor 170 to rotate cylinder 12 to index into the system flow path the clean-out barrel assembly in an attempt to flush out the plug of potatoes or food product. Again, upon expiration of the time delay, the pressure transducer is again activated. If the plug of food product has been cleared through the clean-out barrel assembly, the over pressure condition will have ended and the microprocessor will again cause the stepping motor 170 to index cylinder assembly 12 to the next clean, unplugged barrel assembly and normal operation will once again continue. If the over pressure transient has not cleared, it indicates that an attempt to blow out the plugging food product through the clean-out barrel assembly was unsuccessful, and the system will shut down to await manual inspection and repair.

The relay which utilizes the output voltage from the pressure transducer as a control signal is itself adjustable to provide an adjustable set point at which the relay is energized, thereby functioning as an electrical on/off switch indicating when a blockage in the cutter head assembly is occurring.

While there is shown and described the present preferred embodiment of the invention, it is to be distinctly understood that this invention is not limited thereto but may be variously embodied to practice within the scope of the following claims.

I claim:

1. In a hydraulic cutting apparatus having a food product suspended in a liquid and flowing through a liquid flow pathway which includes an acceleration tube for aligning and accelerating the food product, an array of cutter blades disposed within said pathway through which said liquid passes and into which said food product impinges and is cut into pieces, thereby generating a normal pressure transient within the liquid within the pathway, means for sensing normal pressure transients, and for sensing above normal pressure transients, a method of stopping the flow of liquid and suspended food product into the array of cutter blades, which comprises:

sensing normal pressure transients within the liquid within said liquid pathway during normal operation wherein food product is impinging upon, being cut and passing through the array of cutter blades;

sensing an occurrence of an above normal pressure transient within the liquid within said liquid pathway; and stopping the flow of liquid and suspended food product into the array of cutter blades when the means for sensing above normal pressure transients senses the occurrence of an above normal pressure transient.

2. The method of claim 1 wherein the hydraulic food cutting apparatus further includes a diversion pathway for receiving the flow of liquid and suspended food product from the acceleration tube, wherein the step of stopping the flow of liquid and suspended food product into the array of cutter blades when the means for sensing above normal pressure transients senses the occurrence of an above normal pressure transient further comprises diverting the flow of food product suspended in liquid into the diversion pathway.

3. In a hydraulic cutting apparatus having a liquid flow pathway through which flows a suspension of food product and liquid, a plurality of cutter blade pathways each containing an array of cutter blades through which said liquid passes and into which said food product impinges and is cut into pieces thereby generating a normal pressure transient within the liquid passing through said cutter blade pathway, means for selectively directing the flow of food product suspended in liquid from the liquid flow pathway to a selected one of the cutter blade pathways, means for sensing normal pressure transients, and for sensing above normal pressure transients, a method of selectively directing the flow of liquid and suspended food product into the selected cutter blade pathway which comprises:

sensing normal pressure transients within the liquid during normal operation wherein food product is impinging upon, being cut and passing through the array of cutter blades within the selected cutter blade pathway;

sensing an occurrence of an above normal pressure transient within the liquid; and redirecting the flow of liquid and suspended food product into another cutter blade pathway when the means for sensing above normal pressure transients senses the occurrence of an above normal pressure transient.

4. In a hydraulic cutting apparatus having a food product suspended in a liquid and flowing through a liquid flow pathway which includes an array of cutter blades disposed within said pathway through which said liquid passes and into which said food product impinges and is cut into pieces, thereby generating a normal pressure transient within the liquid within the pathway, means for sensing normal pressure transients and for sensing above normal pressure transients, a method of stopping the flow of liquid and suspended food product into the array of cutter blades, which comprises:

sensing normal pressure transients within the liquid within said liquid pathway during normal operation wherein food product is impinging upon, being cut and passing through the array of cutter blades;

sensing an occurrence of an above normal pressure transient within the liquid within said liquid pathway; and stopping the flow of liquid and suspended food product into the array of cutter blades when the means for sensing above normal pressure transients senses the occurrence of an above normal pressure transient.

5. The method of claim 4 wherein the hydraulic food cutting apparatus further includes a diversion pathway for receiving the flow of liquid and suspended food product from the liquid pathway before said liquid flows through and said food product impinges upon the array of cutter blades, wherein the step of stopping the flow of pressurized liquid and suspended food product into the array of cutter blades when the means for sensing above normal pressure transients senses the occurrence of an above normal pressure transient further comprises diverting the flow of food product suspended in liquid into the diversion pathway.

6. In a hydraulic cutting apparatus having a food product suspended in a liquid and flowing through a liquid flow pathway which includes a source of said food product suspended in said liquid, an acceleration tube for aligning and accelerating the food product, and an array of cutter blades disposed within said pathway through which said liquid passes and into which said food product impinges and is cut into pieces, thereby generating a pressure transient within the liquid within the pathway, an improvement which comprises:

means for sensing normal pressure transients within the liquid within said liquid pathway during normal operation wherein food product is impinging upon, being cut and passing through the array of cutter blades;

said sensing means also sensing an occurrence of above normal pressure transients within the liquid within said liquid pathway; and means for stopping the flow of liquid and suspended food product into the array of cutter blades when the means for sensing above normal pressure transients senses the occurrence of an above normal pressure transient.

7. The hydraulic cutting apparatus of claim 6 wherein the means for sensing normal and above normal pressure transients within the liquid is a pressure sensing transducer.

8. The hydraulic cutting apparatus of claim 6 wherein the means for stopping the flow of liquid and suspended food product into the array of cutter blades when the means for sensing above normal pressure transients senses the occurrence of an above normal pressure transient further comprises:

a diversion pathway for receiving the flow of liquid and suspended food product; and means for diverting the flow of food product suspended in liquid into said diversion pathway.

9. The hydraulic cutting apparatus of claim 8 wherein the diversion pathway is a recirculating line for returning the flow of liquid and suspended food product from the acceleration tube to the source of food product suspended in liquid.

10. The hydraulic cutting apparatus of claim 8 wherein the diversion pathway is a second hydraulic cutting apparatus having a liquid flow pathway and an array of cutter blades disposed within said liquid flow pathway through which said liquid passes and into which said food product impinges and is cut into pieces.

11. A hydraulic food cutting apparatus which comprises:
    a pump for receiving, and discharging a suspension of food products in a liquid;
    a converging tube, having a inlet end operatively connected to a discharge of said pump, for receiving a mixture of said liquid and suspended food products therein, and for accelerating and aligning said food products, said converging tube having a convergent discharge end through which the liquid and suspended food products are discharged;
    an assembly having a plurality of barrel tubes held in parallel relationship;
    alignment means for adjustably holding said assembly in a position wherein each barrel tube is selectively alignable with the discharge end of the converging tube to form a liquid flow pathway from the discharge of said pump through the converging tube and through the selected and aligned barrel tube;
    means for selectively positioning the assembly to align a selected one of said barrel tubes with the discharge end of the converging tube;
    a plurality of arrays of cutting blades through which said liquid passes and into which said food product impinges and is cut into pieces, thereby generating a normal pressure transient within the liquid within the pathway; and
    means for selectively positioning and holding each array of cutting blades within a respective barrel tube.

12. The hydraulic food cutting apparatus of claim 11 which further comprises:
    means for sensing normal pressure transients within the liquid within said liquid pathway during normal operation wherein food product is impinging upon, being cut and passing through the array of cutter blades within the selected and aligned barrel tube;
    said sensing means also sensing an occurrence of above normal pressure transients within the liquid within said liquid pathway; and
    means for selectively repositioning the assembly to align another selected barrel tube with the discharge end of the converging tube when the means for sensing above normal pressure transients senses the occurrence of an above normal pressure transient.

13. The hydraulic food cutting apparatus of claim 12 which further comprises:
    a clean out barrel held in parallel spaced relationship with the barrel tubes within the assembly.

14. The hydraulic food cutting apparatus of claim 11 which further comprises:
    a clean out barrel held in parallel spaced relationship with the barrel tubes within the assembly.

15. The hydraulic food cutting apparatus of claim 11 wherein said assembly having a plurality of barrel tubes held in parallel relationship further comprises means for holding the plurality of barrel tubes in parallel and radially equidistant relationship to each other.

16. The hydraulic food cutting apparatus of claim 11 wherein each of said barrel tubes further comprise:
    a hollow cylindrical barrel having an inlet end and an outlet end;
    an insert liner held within said hollow cylindrical barrel, said insert liner having a passageway therethrough from an upstream end to a downstream end for the passage of said food product suspended in said liquid, said insert liner further having, at its upstream end, a cutter blade receiving space.

17. The barrel tube assembly of claim 16 which further includes within the insert liner a venturi formed in the passageway near the downstream end.

18. A hydraulic food cutting apparatus which comprises:
    a pump for receiving and discharging a suspension of food products in a liquid;
    a converging tube, having an inlet end operatively connected to a discharge of said pump, for receiving a mixture of said liquid and suspended food products therein and for accelerating and aligning said food products, said converging tube further having a convergent discharge end through which the liquid and suspended food products are discharged;
    a cylinder, containing a plurality of barrel tubes therethrough in parallel and radially equidistant relationship;
    alignment means for rotatably mounting said cylinder in a position wherein each one of the barrel tubes is selectively alignable with the discharge end of the converging tube to form a liquid flow pathway from the discharge of the pump through the converging tube and through a selected and aligned barrel tube;
    means for selectively rotating the cylinder to align a selected barrel tube with the discharge end of the converging tube;
    a plurality of arrays of cutting blades; and
    means for selectively positioning and holding each array of cutting blades within a respective barrel tube.

19. A hydraulic cutting apparatus which comprises:
    a liquid flow pathway through which flows a suspension of food product and liquid;
    a plurality of cutter blade pathways each containing an array of cutter blades through which said liquid passes and into which said food product impinges and is cut into pieces thereby generating a normal pressure transient within the liquid passing through said cutter blade pathway;
    means for selectively directing the flow of food product suspended in liquid from the liquid flow pathway to a selected one of the cutter blade pathways,
    means for sensing normal pressure transients within the liquid during normal operation wherein food product is impinging upon, being cut and passing through the array of cutter blades within the selected cutter blade pathway;
    said sensing means also sensing an occurrence of above normal pressure transient within the liquid; and
    means for redirecting the flow of liquid and suspended food product into another cutter blade pathway when the means for sensing above normal pressure transients senses the occurrence of an above normal pressure transient.

20. A hydraulic cutting apparatus for use with food product suspended in a liquid which comprises:
    a liquid flow pathway through which flows the food product suspended in a liquid;
    an array of cutter blades disposed within said liquid flow pathway through which said liquid passes and into which said food product impinges and is cut into pieces, thereby generating a normal pressure transient within the liquid within the pathway;

means for sensing normal pressure transients within the liquid within said liquid flow pathway during normal operation wherein food product is impinging upon, being cut and passing through the array of cutter blades;

said sensing means also sensing the occurrence of an above normal pressure transients within the liquid within said liquid flow pathway; and means for stopping the flow of liquid and suspended food product into the array of cutter blades when the means for sensing above normal pressure transients senses the occurrence of an above normal pressure transient.

21. The apparatus of claim 20 which further comprises:

a diversion pathway for receiving the flow of liquid and suspended food product from the liquid flow pathway before said liquid flows through and said food product impinges upon the array of cutter blades; and means for diverting the flow of food product suspended
in liquid into the diversion pathway.

* * * * *